(12) United States Patent
Chen et al.

(10) Patent No.: US 12,313,867 B1
(45) Date of Patent: *May 27, 2025

(54) TEXTURED RETRO-REFLECTIVE MARKER

(71) Applicant: Northern Digital Inc., Waterloo (CA)

(72) Inventors: Larry Chen, Fergus (CA); Derek Peter Zwambag, Guelph (CA); Shaulaine White, Troy (CA); Athanasios Tommy Balkos, Waterloo (CA); Kirsten Galea, Fergus (CA); David Charles Willms, Waterloo (CA)

(73) Assignee: Northern Digital Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,909

(22) Filed: May 10, 2024

Related U.S. Application Data

(60) Provisional application No. 63/465,827, filed on May 11, 2023.

(51) Int. Cl.
| | |
|---|---|
| *G02B 5/12* | (2006.01) |
| *G02B 1/11* | (2015.01) |
| *G02B 5/13* | (2006.01) |
| *G02B 5/132* | (2006.01) |
| *G02B 5/136* | (2006.01) |
| *G02B 26/08* | (2006.01) |
| *G01S 17/66* | (2006.01) |

(52) U.S. Cl.
CPC ............ *G02B 5/136* (2013.01); *G02B 1/11* (2013.01); *G02B 5/13* (2013.01); *G02B 5/132* (2013.01); *G02B 26/0833* (2013.01); *G01S 17/66* (2013.01)

(58) Field of Classification Search
CPC .......... G02B 5/128; G02B 5/13; G02B 5/124; G02B 5/126
See application file for complete search history.

(56) References Cited

U.S. PATENT DOCUMENTS

| | | | |
|---|---|---|---|
| 3,989,775 A | * | 11/1976 | Jack ....................... G02B 5/128 |
| | | | 264/293 |
| 4,957,335 A | | 9/1990 | Kuney |
| 5,650,213 A | | 7/1997 | Rizika et al. |
| 5,780,140 A | | 7/1998 | Nilsen |

(Continued)

FOREIGN PATENT DOCUMENTS

| | | |
|---|---|---|
| DE | 10141976 | 3/2003 |
| WO | WO 2003/020146 | 3/2003 |
| WO | WO 2007/064817 | 6/2007 |

*Primary Examiner* — Euncha P Cherry
(74) *Attorney, Agent, or Firm* — Fish & Richardson P.C.

(57) ABSTRACT

An apparatus comprising a retro-reflective marker and a device configured to receive the retro-reflective marker in a socket located on the top surface of the device. The retro-reflective marker comprises a retro-reflective layer having a first retro-reflectance capability. The retro-reflective layer comprises a textured surface, a portion of the textured surface having a surface topology such that surface normal vectors positioned across the portion extend from the portion of the textured surface in different directions, and a plurality of retro-reflective micro elements distributed across the textured surface. The retro-reflective marker further comprises a border defining a retro-reflective area of the retro-reflective layer, where a portion of the border provides a second retro-reflectance capability lower than the first retro-reflectance capability.

20 Claims, 8 Drawing Sheets

(56) References Cited

U.S. PATENT DOCUMENTS

| | | | |
|---|---|---|---|
| 7,137,712 | B2 | 11/2006 | Brunner et al. |
| 7,945,311 | B2 | 5/2011 | Mccloy et al. |
| 8,386,022 | B2 | 2/2013 | Jutras et al. |
| 8,662,683 | B2 | 3/2014 | Rossner |
| 8,668,340 | B2 | 3/2014 | Jordanov et al. |
| 8,988,505 | B2 | 3/2015 | Schaerer et al. |
| 9,964,649 | B2 | 5/2018 | Shafer et al. |
| 11,045,257 | B2 | 6/2021 | Srimohanarajah et al. |
| 12,078,825 | B1 | 9/2024 | Chen et al. |
| 2009/0026909 | A1* | 1/2009 | Cha .......................... H01J 11/12 313/582 |
| 2011/0254922 | A1 | 10/2011 | Schaerer et al. |
| 2015/0309187 | A1 | 10/2015 | Shafer et al. |
| 2017/0238998 | A1 | 8/2017 | Srimohanarajah et al. |
| 2017/0303859 | A1 | 10/2017 | Robertson et al. |
| 2021/0401535 | A1* | 12/2021 | Ayala ..................... A61B 90/39 |
| 2022/0096168 | A1 | 3/2022 | White et al. |
| 2022/0156966 | A1 | 5/2022 | Chen et al. |
| 2022/0413196 | A1 | 12/2022 | Chen et al. |

* cited by examiner

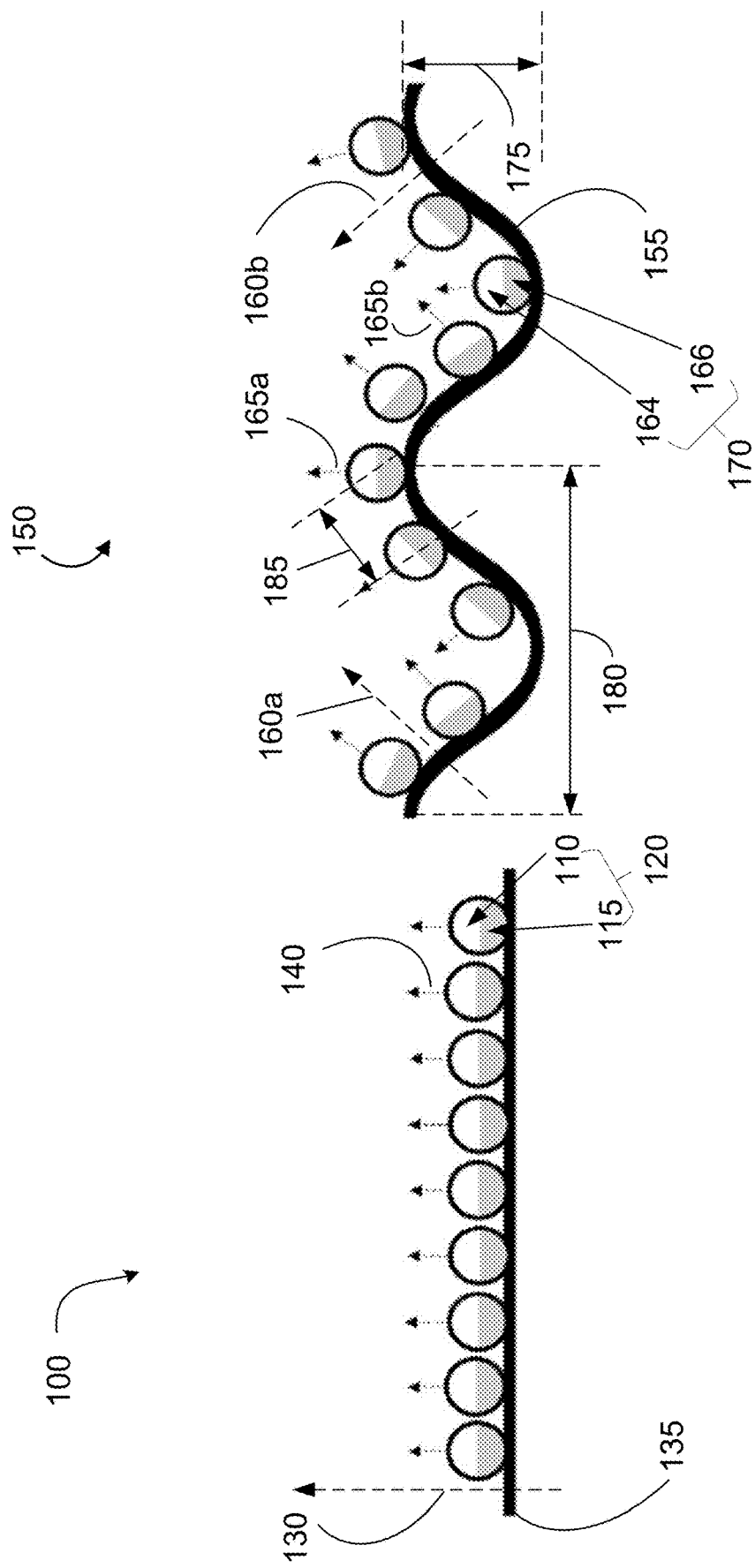

TEXTURED RETRO-REFLECTIVE MARKER

CLAIM OF PRIORITY

This application claims priority under 35 USC § 119 (e) to U.S. Patent Application Ser. No. 63/465,827, filed on May 11, 2023, the entire contents of which are hereby incorporated by reference.

TECHNICAL FIELD

This disclosure relates to retro-reflective markers, and in particular, retro-reflective markers with a textured retro-reflective layer.

BACKGROUND

Tracking systems (e.g., optical tracking systems) typically rely on objects having one or more markers affixed thereto.

SUMMARY

Described herein is a retro-reflective marker used for a tracking system that is configured to determine a position of a tracked object in an environment by estimating the pose(s) (e.g., positions and orientations) of one or more markers affixed to the tracked object. In contrast to conventional markers that are in flat disc-shape with a limited viewing angle between 45 and 60 degrees, the retro-reflective markers described herein include a textured retro-reflective layer. The textured retro-reflective layer includes a surface topology that has a wavy top surface coated with multiple retro-reflective beads. The wavy top surface has a varying surface normal at different locations on the surface. For example, a portion of the textured surface can have a surface topology such that surface normal vectors positioned across the portion extend from the portion of the textured surface in different directions. The beads are small relative to the size of the textured layer and the characteristic sizes of features of the textured layer (or geometries of the textured layer). The characteristic sizes for the textured layer can include a wavelength of one or more waves defined in the surface topology, an amplitude of the one or more waves, or other suitable features. The beads are deposited in the textured surface such that, for each bead of the deposited beads, a normal axis (also referred to as a retro-reflective axis) of the bead for retro-reflecting an incoming light beam aligns as much as possible with a corresponding surface normal vector at the location where the beam is deposited.

In some cases, the textured retro-reflective layer has a circular shape, a donut shape, or other suitable shapes, where a circular shape layer can also be referred to as a disc layer or a disc marker. In some cases, the textured retro-reflective layer has a circular shape, but the beads are only deposited outside the central region of the textured layer, e.g., to form a ring-shaped retro-reflective region. Alternatively or in addition, the center portion of the textured retro-reflective layer can be a flat surface.

To reduce errors in tracking positions and improve the tracking accuracy, the system can include a border placed over the textured retro-reflective layer to define a retro-reflective area. Optionally, the system can further include a protective cover or layer coated with an anti-reflective coating on a top surface or a bottom surface of the protective layer. This is to address two sources of errors generally factored into marker design. One source is direct light reflection from the top-encapsulating layer of the retro-reflective layer. These direct reflections interfere with retro-reflected signals and add inaccuracies. The second source is the contrast with the disc layer border. Commonly used bordering material, such as plastic and anodized aluminum, may not reflect much visible light, but do reflect NIR (near infrared) light, which also adds inaccuracies to the retro-reflected signal.

In some cases, the border can have a portion that provides a lower level of retro-reflectance capability than the retro-reflective region. The portion of the border can be a circular geometry with a width of at least 1 millimeter (e.g., 1, 2, 4, 10, or more millimeters). The border can be a ring or donut shape slightly larger than the textured retro-reflective layer. In some cases, the protective layer is a near-infrared (NIR) filter. In some cases, the anti-reflective coating coated on the protective layer is a near-infrared (NIR) wavelength-specific anti-reflective coating.

In a general aspect, a retro-reflective marker for an optical position measurement system includes a retro-reflective layer and a border. The retro-reflective layer provides a first retro-reflectance capability. The retro-reflective layer includes a textured surface, where a portion of the textured surface has a surface topology such that surface normal vectors positioned across the portion extend from the portion of the textured surface in different directions. The retro-reflective layer also includes a plurality of retro-reflective micro elements distributed across the textured surface. The border defines a retro-reflective area of the retro-reflective layer. At least a portion of the border provides a second retro-reflectance capability lower than the first retro-reflectance capability.

Implementations can include one or more of the following features.

In some implementations, the retro-reflective marker can be received by one or more sockets or indents on the top surface of a device for optical tracking.

In some implementations, each of the plurality of retro-reflective micro elements can have a retro-reflective axis aligned with a corresponding surface normal vector at a corresponding location that the retro-reflective micro element is adhered. The plurality of retro-reflective micro elements can include a plurality of beads. Each bead can have a first portion with a reflective surface, and a second portion that is substantially transparent. The reflective surfaces of the plurality of beads can include aluminum, silver, or a combination thereof.

In some implementations, wherein the retro-reflective marker can be visible for light incident relative to a surface normal vector of the textured surface at an angle above 55 degrees.

In some implementations, the second retro-reflectance capability can be lower than the first retro-reflectance capability by at least 20%.

In some implementations, the portion of the border can include a ring-shape geometry with a width of at least 1 millimeter.

In some implementations, the surface topology can be a sinusoidal geometry that includes one or more waves. A wavelength of the one or more waves of the surface topology can range between 1% and 50% of a size of the retro-reflective area. An amplitude of the one or more waves of the surface topology can range between 0.5% and 25% of a size of the retro-reflective area.

In some implementations, the textured retro-reflective marker can include a protective layer positioned over the retro-reflective layer. The protective layer can include an anti-reflective coating applied to a top surface or a bottom surface of the protective layer. The anti-reflective coating can include a near-infrared (NIR) wavelength-specific anti-reflective coating. The protective layer can cover the retro-reflective layer, and the border partially can cover the protective layer. The protective layer can be a near-infrared (NIR) filter. The NIR filter can be made from an Astra™ NIR-75N 1.0 mm that is configured to transmit from 850 nm.

In some implementations, the retro-reflective layer can have a circular shape. In some cases, the central portion of the retro-reflective layer is not retro-reflective.

In some implementations, the textured retro-reflective marker can include a base, and the textured retro-reflective layer can be attached to the base. The textured surface can define a first central opening, and the base can define a second central opening aligned with the first central opening when the retro-reflective layer is attached to the base.

In some implementations, the textured retro-reflective marker can include a connector for attaching the base and the textured surface. The connector can provide a snap-fit connection or threaded connection for attaching at least the base and the textured surface through the first and second central openings.

In some implementations, the retroreflective marker can be affixed to an object for being targeted by an optical position measurement system.

The implementations described herein can provide various technical benefits. For example, the described marker is retro-reflective across a wider range of orientations. Conventional markers without a textured surface are not robust to light beams. More specifically, the viewing angle of a conventional marker is generally limited to the entrance angle of the retro-reflective elements (although the viewing angle can be slightly greater than the entrance angle due to manufacture-caused variability in the normal axes of the retro-reflected beads). Due to the textured surface with varying surface normal vectors and the alignment of normal axes of beads and local surface normal vectors, the markers described herein can have a wider viewing angle and are robust to different orientations of incoming light beams. In addition, the performance of an optical position measurement system using the textured marker is improved at all possible viewing angles when the system measures the three-dimensional positions of the textured marker, further leading to an increase in the accuracy and efficiency of tracking a target or an object.

In addition, by using a border to create a high contrast in total retro-reflectance across the border, the marker further improves the accuracy of tracking objects using a corresponding optical position measurement system. Without a border, the accuracy decreases due to stray reflections off one or more surfaces adjacent to the retro-reflective surface. These stray reflections are often bright enough to distort retro-reflective signals and introduce errors into an optical positioning system. In addition, to increase the accuracy, the marker described herein can include a protective covering or layer over the textured retro-reflective layer and the border. The protective covering can be further applied with a particular anti-reflective coating.

In some implementations, the marker can include a base. The base can include a locating feature configured to guide the retro-reflective layer of the marker when the retro-reflective layer is placed on the top surface of the base such that the center of the retro-reflective layer aligns with the center of the base. Additionally, the base can include a central opening configured to releasably attach to a connector. The connector can include a body with a top surface and a bottom surface. The connector can include a conical structure extending from the top surface, and two projects extending from an outer surface of the conical structure.

The central opening can receive the conical structure and the two projects. In some implementations, the central opening is configured to releasably couple with the connector by inserting and twisting the connector by a particular angle. The central opening can further include a cavity at a position corresponding to the two projects so that when the two projects are twisted into the cavity, the connector is releasably coupled to the base. Alternatively or in addition, the connector is configured to releasably couple to the base by a snap-fit connection or threaded connection.

The details of one or more embodiments are set forth in the accompanying drawings and the description below. Other features and advantages will be apparent from the description and drawings, and from the claims.

BRIEF DESCRIPTION OF THE DRAWINGS

FIGS. 1A and 1B show an example of a flat retro-reflective layer and an example of a textured retro-reflective layer, respectively.

Like reference numbers and designations in the various drawings indicate like elements.

DETAILED DESCRIPTION

Figure 2A:
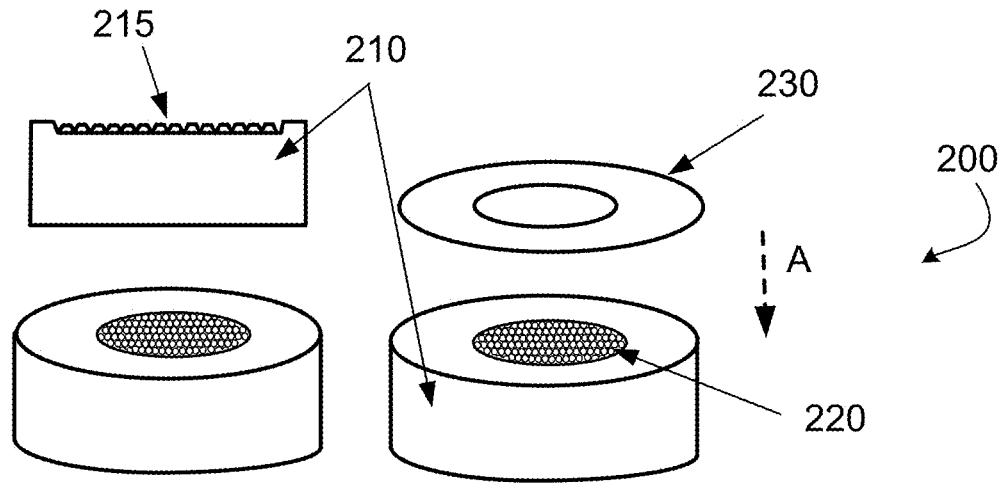
FIGS. 2A and 2B show examples of a textured retro-reflective marker and corresponding exploded views.

Described herein is a marker implemented in a tracking system that is configured to determine a pose (e.g., position and orientation) of a tracked object in an environment using one or more markers. The tracked object generally includes such markers that are configured to provide signals to a tracking system that includes a sensor configured to measure the signals from the markers. The signals indicate the pose of the tracked object in the environment based on the pose of each of the markers. For example, the tracking system can be an optical tracking system or an optical position measurement system, and the markers can be passive markers configured to retro-reflect an optical signal from the tracked object. The passive markers can be retroreflective such that they are configured to reflect an optical signal along a parallel path back towards a source of the optical signal. Generally, an optical sensor (e.g., a camera) is positioned near the source of the optical signal and configured to detect the reflected optical signal from each of the markers. A retro-reflection (e.g., a glint) is detected for each marker. The tracking system is configured to estimate where the passive marker is in the environment based on where the retro-reflected signal is detected.

In a medical application context, a user (e.g., a doctor) touches a surface of interest (e.g., a surface of a patient's body) using a distal tip of an object (e.g., a probe or a surgical instrument.) An object sensing device views the marker(s) affixed to the object. On the basis of the known locations of the sensing device and the location of the object(s) as seen by the sensing device, such systems calculate the three-dimensional coordinates of the object(s).

The markers that are affixed to the object may be active markers (e.g., light emitting diode markers), passive markers or a combination of active and passive markers. The marker described herein is a passive marker. Generally, passive markers can be configured to reflect an optical signal toward a camera. The marker can be configured to reflect the optical signal on a parallel path back toward the signal source. In response to detection, by a camera, of an optical signal reflected from the marker, a tracking system can estimate a position of the marker in an environment.

One or more markers can provide a signal to one or more sensors (e.g., cameras) of a tracking system. The signal indicates the position and orientation (e.g., pose) of the markers in the environment, from which the pose of the tracked object can be estimated. The tracking system can be an optical tracking system (e.g., an optical position measurement system), and the markers can be passive retro-reflective markers configured to reflect an optical signal to the tracking object in a retro-reflective manner (e.g., such that optical signals are reflected back towards a source of the optical signal with minimum scattering). Generally, an optical sensor (e.g., a camera) is positioned near the source of the optical signal and configured to detect the reflected optical signal from the markers. A reflection (e.g., a glint) is detected on each of the markers. The tracking system is configured to estimate where the markers are in the environment based on where the reflected signal is detected. The pose of the tracked object is subsequently determined based on a predetermined relationship between the pose of each of the markers and the pose of the tracked object.

Passive markers can employ one or more geometries such as retro-reflective spheres. A spherical shape is used because the projected image of a spherical marker onto a plane for sensor detection is invariant from different observation points at around 90 degrees. In some cases, passive markers can include flat disc-shaped markers.

The marker described herein includes a textured marker that has a textured retro-reflective layer. At least a portion of the textured marker can employ various geometries, for example, a surface topology such that surface normal vectors positioned across the portion extend from the portion of the textured surface in different directions. In other words, the surface normal vectors vary in different directions at different locations on the textured layer. In some implementations, the textured surface is attached with multiple retro-reflective micro elements. Each of the multiple retro-reflective micro elements has a normal axis that is aligned with a corresponding surface normal vector at the location where the retro-reflective micro element is located. The textured marker can further include a border to improve the tracking accuracy. More details of the marker and its assembly are described below.

FIGS. 1A and 1B show an example of a flat retro-reflective layer 100 and an example of a textured retro-reflective layer 150, respectively. In general, the textured marker described herein includes a layer such that at least a portion of the layer is a textured retro-reflective layer 150. In some implementations, the textured marker described herein can include a first portion that is a textured retro-reflective layer 150, and another portion that is a flat retro-reflective layer 100. No matter whether it is due to the texture of the retro-reflective layer itself (e.g., flat or textured) or the arrangement of micro elements and their coatings, the overall marker can or should have a respective retro-reflective direction at different locations on the retro-reflective layer. More details are described below in connection with FIG. 1B.

An ordinary retro-reflective layer can be schematically shown in FIG. 1A. Here, a flat retro-reflective layer 100 for a marker has a flat surface 135. The flat surface 135 has a uniform surface normal vector 130. In other words, at any location on the flat surface 135, the surface normal vector aligns with other surface normal vectors at different locations. The flat retro-reflective layer 100 can further include multiple retro-reflective micro elements 120 attached onto the flat surface 135. Each of the multiple retro-reflective micro elements 120 has a normal axis 140. In general, the normal axis 140 of the retro-reflective micro element 120 substantially represents a direction or light path traveled by a light beam reflected by the retro-reflective micro element 120. The normal axis 140 can also be referred to as a retro-reflective axis. As shown in FIG. 1A, the multiple retro-reflective micro elements 120 can be substantially spherical and are attached to the flat surface 135 such that their corresponding normal axes 140 are substantially aligned with the surface normal vector 130. Since the surface normal vector 130 is uniform, the normal axes 140 are also substantially parallel to each other.

However, the range of incident angles of incoming light beams or signals for retro-reflecting using the flat retro-reflective layer 100 is limited. For example, the incident angles are limited to up to 45-50 degrees. An incident angle is normally defined to be an angle between the incident light beam and the uniform normal surface vector of the flat surface 135. Although the retro-reflectivity (e.g., the brightness of the reflected light) can be maximized by optimizing the alignment between the uniform surface normal vector 130 and the micro elements' normal axes, for the maximum brightness and uniformity on the flat layer, the incident angles usually stay no greater than 45 degrees.

To increase the incident angle for better measuring positions (or tracking objects) using retro-reflective light beams, the described techniques implement a textured retro-reflective layer 150, as shown in FIG. 1B. As described above, the markers described herein can include a layer such that at least a portion of the layer is the textured retro-reflective layer 150. In some implementations, the markers described herein can have a first portion that is textured and a second portion that is flat.

As shown in FIG. 1B, the textured surface 155 can have a particular pattern or surface topology. For example, the textured surface 155 can have a repeated wavy pattern along a horizontal direction. As another example, the surface topology can include a sinusoidal geometry with one or more waves. As shown in FIG. 1B, the sinusoidal geometry can have a particular wavelength 180, and a particular amplitude 175. The wavelength 180 can range from 1% to 50% of the characteristic size of the textured surface 150 or the corresponding marker. The amplitude 175 can range from 0.5% to 25% of the characteristic size of the textured surface 150 or the corresponding marker. The characteristic size for a textured surface can include a diameter, an edge length, a diagonal length, or other suitable sizes of the textured surface. In some cases, the textured surface 155 can have one or more portions with a repeating wavy pattern. For example, the wavy patterns can have one or more periods. In some cases, the textured surface 155 can have more than one repeated wavelength and amplitude. Alternatively, the textured surface 155 might not have any repeated patterns. It should be noted that the surface topology of the textured surface 155 can include other suitable geometries and patterns.

Due to the pattern or surface topology of the textured surface 155, at least a portion of the textured retro-reflective layer 150 has varying surface normal vectors (e.g., 160a, 160b) at different locations on the textured surface 155. For example, the surface normal vector 160a at a first location points toward a different direction than the surface normal vector 160b at a second location. The surface normal vectors change orientations due to the change of curvature at different locations of the textured surface 155. It should be noted that if the textured retro-reflective layer 150 has repeating patterns, two surface normal vectors at different locations might have the same orientation. For example, the surface normal vectors at different locations yet with the same phase in their respective pattern period (e.g., surface normal vectors of two peak points of a sinusoidal wave) extend from their respective period locations toward the same direction.

To achieve a wider incident angle, the textured surface 155 can be attached by multiple retro-reflective micro elements 170 with normal axes aligning with the local surface normal, as shown in FIG. 1B. For example, a first micro element can have a normal axis 165a aligned with the surface normal vector at the location where the first micro element is located, and a second micro element can have a normal axis 165b aligned with the surface normal vector at the location where the second micro element is located. As described above, a normal axis (also referred to as a retro-reflective axis) generally represents a direction along which light reflected by the retro-reflective micro element 170 travels. Since the normal axes 165a, 165b of the micro elements 170 align with the corresponding local surface normal, the normal axes 165a and 165b face different orientations across the entire textured surface 155.

For a target or a marker to be visible by an optical tracking system or an optical position measurement system, not all of the retro-reflected micro elements need to be retro-reflecting the incoming light beams. As long as a portion of the retro-reflected micro elements can retro-reflect light beams with particular incident angles, the marker can be viewed (and detected) by the optical tracking system. Although not all of the retro-reflective micro elements 170 would retro-reflect a particular light beam, the likelihood of at least a portion of the retro-reflective micro elements 170 retro-reflecting an incoming light increases due to the surface topology of the textured surface 155. This way, the corresponding marker as a whole remains retro-reflective across a wider range of orientations. Accordingly, the incoming light beams with larger incident angles (e.g., angles above 45 degrees) can still be retro-reflected by the marker, and the viewing angles of the marker also become greater.

Instead of achieving respective retro-reflective directions by using a textured surface as described above, the techniques described herein can achieve a substantially similar function by using a non-textured (e.g., flat) surface. In these implementations, the retro-reflective coatings are not coated on the top surface of the non-textured surface. Rather, the retro-reflective coatings are coated to at least a portion of each micro element (e.g., a micro sphere or micro bead). For example, each micro element can have an external spherical surface, 10%, 20%, 30%, 50%, etc. of which is covered or coated by a retro-reflective coating. These micro elements can be distributed on the non-textured surface in a controlled fashion. For example, the described techniques can implement a randomness algorithm to distribute these micro elements onto the non-textured surface. Since these coated micro elements are arranged with respective orientations on the non-textured surface, each micro element can have a respective retro-reflective direction and the entire surface thus can have a wider range of retro-reflectivity.

In some implementations, the micro elements can include spherical beads of different diameters, can have micro elements that are not in perfect spheres, can have micro-elements with different coating ratios, etc. These micro elements can be arranged on the flat surface in a controlled fashion by one or more particular algorithms, e.g., a randomness algorithm. Other suitable algorithms for perturbing retro-reflective directions of a flat surface covered by micro elements can be implemented according to different retro-reflectivity requirements and tasks.

In some implementations, only a portion of the textured layer is attached with retro-reflective micro elements. For example, e.g., the central region of the retro-reflective layer can be void of micro elements, the central region of the retro-reflective layer can be an opening, etc. In some cases, only a portion of the retro-reflective marker includes the retro-reflective textured layer 150, for example, the central region of the marker can be flat with or without retro-reflective micro elements, and only the outskirt of the central region includes the textured layer 150 with retro-reflective micro beams.

In addition, the textured retro-reflective marker including the above-described retro-reflective layer 150 can be applied or attached to a medical device. The medical device can be an object detectable by an optical tracking system. Since the textured surface 155 has varying sizes in the depth direction and the flat surface 135 does not, tracking particular states or positions of an object using an optical tracking system implementing the described textured retro-reflective marker becomes more accurate and efficient, in addition to the above-described increase in the range of incident angles and view angles.

The retro-reflective micro elements 120 or 170 (also referred to as micro beads) can be produced from various materials, combinations of materials, etc. For example, glass-similar material can be utilized alone or in concert with one or more other materials. In this description, the micro elements (e.g., the retro-reflective micro elements 120 or 170) are also referred to as micro beads or beads in the following description.

In some implementations and as shown in FIGS. 1A and 1B, each bead (e.g., bead 120, bead 170, etc.) can include a reflective portion, provided by a reflective coating on a portion of the surface of the bead (e.g., portion 115 of bead 120, portion 166 of bead 170, etc.). The reflective coating 115 or 166 can include one or more materials such as silver, aluminum, or any similar reflective material. In addition, each bead can include a non-retro-reflective portion or a transparent portion (e.g., portion 110 of bead 120, portion 164 of bead 170, etc.). Generally, a transparent portion of a bead is transmissive for one or more portions of the electromagnetic spectrum; for example, in the near-infrared (NIR) band or other bands of the EM spectrum. Because the refractive index causes retro-reflectivity in the bead, the refractive index is generally greater than 1.6 in the NIR band.

The non-retro-reflective portion can be formed by one or more transparent materials. For example, the non-reflective portion can include barium titanate. In general, barium titanate includes a crystalline structure to maintain a dipole. The dipole can be used to control the orientation of beads (or the normal axes of the beads) when they are disposed on the layer, such that the normal axes of the beads can substantially align with the surface normal vector(s) of the layer. For example, by using the dipole techniques, the normal axis 140 of a bead disposed on the flat surface 135 can be aligned with the uniform surface normal 130 of the flat surface 135; the normal axis 165a of a bead disposed on the textured surface 155 can be aligned with a corresponding surface normal vector at a corresponding location of the textured surface 155; and the normal axis 165b of another bead disposed on the textured surface 155 can be aligned with a corresponding surface normal vector at a corresponding location of the textured surface 155.

Other techniques can be used to implement the retro-reflectivity. For example, the retro-reflectivity can be introduced by reflective particulates (e.g., flakes) in a medium where beads are disposed—not by the retro-reflective portion of the beads. The particulates can include one or more materials such as aluminum, silver, or a similar reflective material. The medium is applied on the top surface of the layer surface (e.g., flat surface 135 or textured surface 155).

In general, the textured marker using the above-described textured surface and retro-reflective micro elements disposed on the textured surface can remain visible for incoming light beams with incidence angles up to around 80 degrees. In contrast to a retro-reflective marker with micro elements disposed on a flat surface, the incident angle for the textured marker is defined to be an angle between an incident light and a normal to a plane associated with the textured surface. The plane associated with the textured surface can be a surface where the textured surface is placed. Alternatively, the plane can be a virtual plane substantially aligned with the textured surface. Due to the surface topology of the textured surface (e.g., textured surface 155) and the retro-reflective micro elements (e.g., beads 170), the textured marker can be generally visible for light arriving at an incident angle ranging from 0 degrees (i.e., normal to the textured marker or the plane) to approximately 80 degrees. Using the textured marker, errors in the determined position of the marker are relatively low for light arriving at incident angles that range from 0 degrees to 60 degrees, with positional errors potentially growing for incident angles larger than 60 degrees. The range of incident angles provided by the retro-reflective marker having a textured surface is comparably larger than that provided by a retro-reflective marker having flat surface, which are generally only visible for light arriving at incident angles from 0 degrees to approximately 55 degrees (and for which positional errors can occur and increase at incident angles of 45 degrees and greater).

Figure 2B:
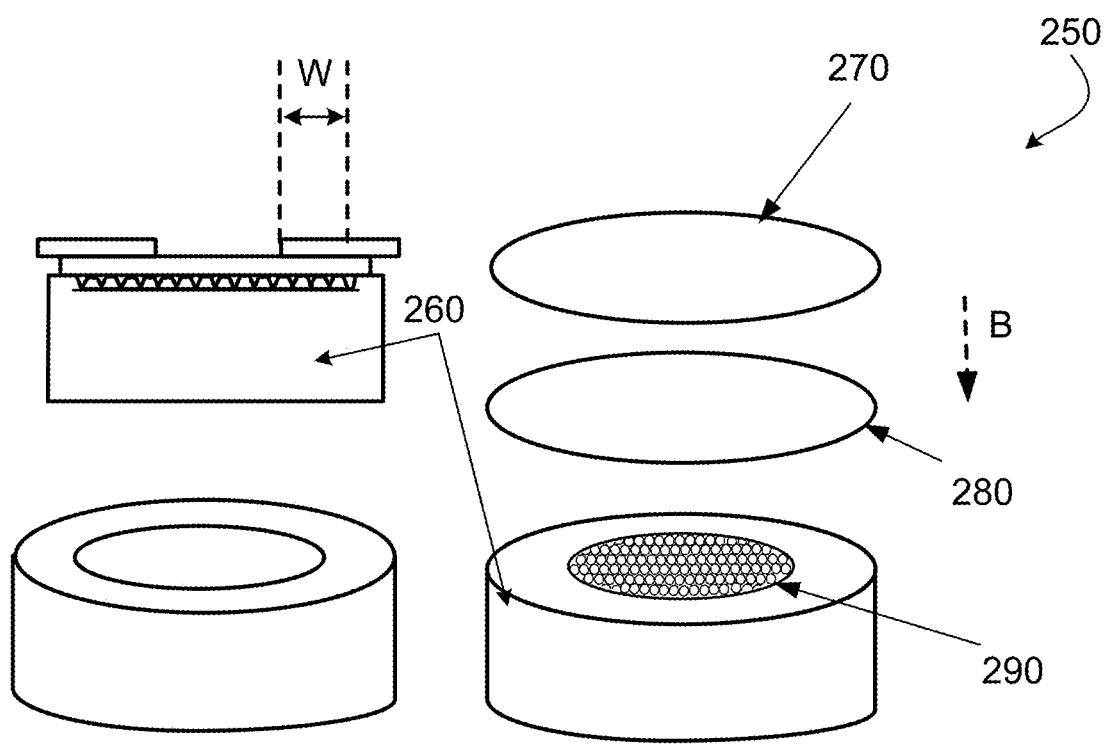

FIGS. 2A and 2B show examples of a textured retro-reflective marker and corresponding exploded views. More specifically, FIG. 2A shows a first example of a textured retro-reflective marker 200 and FIG. 2B shows a second example of a textured retro-reflective marker 250.

As shown in FIG. 2A, the first example of a textured retro-reflective marker 200 can include a base 210, a textured retro-reflective layer 220, and a border 230. The base 210 can be, e.g., a cylindrically shaped base. The retro-reflective layer 220 can be located on top of the base 210. The border 230 can be used to at least partially cover a portion of the textured retro-reflective layer 220. In this example, the border 230 has a circular disc shape with a circular cutout (or opening) at the center of the disc (e.g., a flat donut shape).

One or more assembly techniques can be employed to produce the marker 200, for example, the base 210, the retro-reflective layer 220, and the border 230 can be stacked along axis A. These components can be further affixed with one another using adhesive materials or connectors. One or more examples of assembly using a connector are described in greater detail below in connection with FIGS. 4A and 4B. As shown in FIG. 2A, the border 230 can be placed on top of the textured retro-reflective layer 220; however, in other arrangements, a border 230 can be positioned beneath the textured retro-reflective layer 220. For example, a disc-shaped border that includes a central cutout (e.g., a flat donut-shaped border) or that is absent a cutout (e.g., a flat shape) is positioned below a textured retro-reflective layer 220.

A retro-reflective layer 220 can be housed or received by the base using different techniques. For example and as shown in FIG. 2A, the base 210 can be configured to house a textured retro-reflective layer 220 on a top surface of the base 210. The textured retro-reflective layer 220, for example, can be equivalent to the retro-reflective layer 150 of FIG. 1B. In one example technique, the base 210 can define an indented area 215 that is configured to receive the retro-reflective layer 220. The indented area 215, for example, can have a depth substantially equivalent to an amplitude (e.g., height) of the textured pattern so that when the textured retro-reflective layer 220 is received by the indented area, the portions of the textured layer 220 having a maximum amplitude (e.g., height) are substantially in the same plane as the top surface of the base 210 external to the indented area (e.g., substantially flush to the top surface of the base 210). In some cases, the textured retro-reflective layer 220 can have a substantially disc or circular shape, and the geometry of the indented area 215 is configured to receive the disc or circular shaped layer 220.

The border 230 is included in the retro-reflective marker to address sources that can affect the retro-reflection functionality of the textured retro-reflective layer 220. This way, the accuracy of tracking objects using retro-reflective markers can be further improved. In general, one or more sources can introduce errors; for example, light reflected at an interface between free space and the outermost layer of the marker (e.g., light reflected off a top surface of the marker (e.g., the top surface of the base 210). These direct reflections can interfere with retro-reflected signals and introduce inaccuracies. Another error source is the contrast with the border (e.g., reflection irregularities that occur near the edge of the retro-reflective layer). The one or more edge geometries of the retro-reflective layer, one or more types of material used to construct the retro-reflective layer, etc., can cause reflection irregularities. In addition, the stray reflections off surfaces adjacent to the retro-reflective layer can be bright enough to distort the signal or light beams reflected by the textured layer, introducing additional errors in an optical tracking system.

The border 230 included in the textured retro-reflective marker 200 can be a high-contrast border. A "high contrast" border generally has a retro-reflectance capability that is lower than the retro-reflectance capability of the textured retro-reflective layer 220 such that there is a high contrast in the retro-reflectance capability between the border 230 and the textured retro-reflective layer 220. More specifically and as shown in FIG. 2A, the border 230, once positioned on top of the retro-reflective layer 220, covers at least a portion of the textured retro-reflective layer 220 and defines a retro-reflective region or area (e.g., the region of the textured retro-reflective layer 220 that is not covered by the border 230). The retro-reflectance of the border is less than 20% of the retro-reflectance of the uncovered portion of the retro-reflective layer 220. In some implementations, the retro-reflectance of the border is at least 20% lower than that of the uncovered portion of the retro-reflective layer 220.

The high contrast border can be coated with a near-infrared (NIR) absorbent coating on a surface of the border, e.g., on the top surface of the border 230. The border can include a donut-shaped bordering material that sets the aperture for the marker or the textured retro-reflective layer. The bordering material can be coated with NIR wavelength absorbing coating for suppressing stray light. In some implementations, the border has an NIR absorbent coating 208 and is made from an Acktar Maxiblack™ sheet. As another example, the border can be made of material including Ultem® (e.g., Polyetherimide). As another example, the border can be made of bead blasted aluminum to achieve a retro-reflectance level lower than 20% of the retro-reflective layer.

It is worth noting that border 230 can have a lower reflectance for a particular range of wavelengths in addition to having a lower retro-reflectance capability than the central retro-reflective region. The difference between a retro-reflective light and a reflective light can be generally attributed to the directions of light paths. More specifically, a retro-reflective light substantially travels opposite to the incoming direction, whereas the reflective light can travel along a direction reflected from the incoming direction and is determined by interface material properties and the reflection surfaces. Having a lower reflection rate for a particular range of wavelengths can reduce interference or flares on the receiving sensors, improving the accuracy of the sensor function. One example range of wavelengths can include a range near infrared (NIR) as described above, and the reflectance rate for this range of wavelengths can be 10%, 20%, 50%, etc. lower than the central region. In some implementations, the border 230 can filter out all reflected lights in that particular wavelength range.

In some implementations, the border 230 does not need to have a uniform retro-reflectance capability. Instead, a portion of the border 230 (e.g., a region adjacent to the retro-reflective region defined by the border 230) can have a low retro-reflectance capability. As shown in FIGS. 2A and 2B, the portion of border 230 can have a ring shape with a width (e.g., "W") of at least 1 millimeter, e.g., 1, 2, 4, 5, 10 millimeters, or more due to different retro-reflecting requirements. In some cases, the width of the portion can be a fraction of a millimeter.

In some cases, the retro-reflective marker 200 might not include border 230, but the effect of border 230 can still be achieved by the absence of border materials, e.g., the air. For example, the retro-reflective marker 200 can be placed on a surface of a working platform (e.g., a base, a substrate, or other suitable platforms), and the surface of the working platform can provide a lower retro-reflectance capability than the retro-reflectance capability of the textured layer. More details are described below in connection with FIGS. 4A and 4B.

In some implementations, the marker 200 can have a diameter of about 6 mm-20 mm. In some implementations, the bare textured retro-reflective layer 220 and the border 230 (optionally with an NIR absorbent coating) can have a thickness of less than about 0.5 mm. In some implementations, the aperture of the border 230 can have a diameter of about 4 mm-18 mm.

In some implementations, the overall size of the textured retro-reflective marker can have a diameter of 6 mm to 30 mm. Alternatively, the retro-reflective region (e.g., a region not covered by a border) in the marker can have a circular shape with a diameter of 6 mm to 30 mm. For some flat donut-shaped borders, the central cutout can have the same diameter as a circular-shaped, textured retro-reflective layer. Thus these borders cover substantially no portion of the textured retro-reflective layer.

FIG. 2B shows a second example of a textured retro-reflective marker 250. The second example textured marker 250 has a base 260, a textured retro-reflective layer 290, a protective layer 280, and a border 270. The components of the textured marker 250 can be assembled along axis B. In contrast to the first example textured marker 200, the second example textured marker 250 has a protective layer 280 (also referred to as a cover or a protective cover). The protective layer 280 is positioned on top of the textured retro-reflective layer 290 to reduce the sensitivity of contamination. For example, liquids and dirt can be blocked away from the textured retro-reflective layer 290 by the protective layer 280. The protective layer 290 can be flat and transmissive in the NIR spectrum of 750 nm to 2500 nm. In some cases, the protective layer 290 can be transmissive in the visible spectrum of 380 nm to 750 nm. In addition to the high contrast in retro-reflectance capability provided by the border 270, the protective layer 290 can also include a masking aperture to provide an additional high-contrast border.

The protective layer can have different geometries to improve light transmission. For example, the protective layer 290 can be non-flat, e.g., a curved surface with constant or varying curvatures. For example, the protective cover can be substantially hemispherical. The curvature of the protective layer 290 can be beneficial as it can increase the light transmission when the incoming light arrives at a small incident angle. In contrast to a flat protective layer (where a good portion of the incoming light can be lost due to direct reflection), the curved surface can assist in transmitting more light onto the textured retro-reflective layer.

In some implementations, the protective layer 290 can have a NIR anti-reflective coating and can be a NIR filter. As an example, the NIR filter with NIR anti-reflective coating 206 can have a thickness of about less than 1 mm. In some implementations, the protective layer 290 (e.g., the middle layer) is visibly opaque, NIR transmitting optical filters with NIR wavelength-specific anti-reflective coatings on top and bottom surfaces. In some cases, the anti-reflecting coating can be applied on the top or bottom surface of the protective layer. In some implementations, the protective layer 206 may be made from an Astra™ NIR-75N 1.0 mm that is configured to transmit from 850 nm. In some implementations, the top surface of the protective layer 290 includes an anti-smudge coating 206a (e.g., in addition to the NIR anti-reflective coating).

The anti-reflecting coating can significantly decrease the impact of unwanted reflections on the accuracy of tracking objects. The anti-reflecting coating can further improve light transmission, which leads to an increase in the brightness of the retro-reflected signal. The increase in brightness is significant and beneficial, particularly for measuring retro-reflected light beams from incident angles that tend to generate dimmed retro-reflected light beams.

Figure 3A:
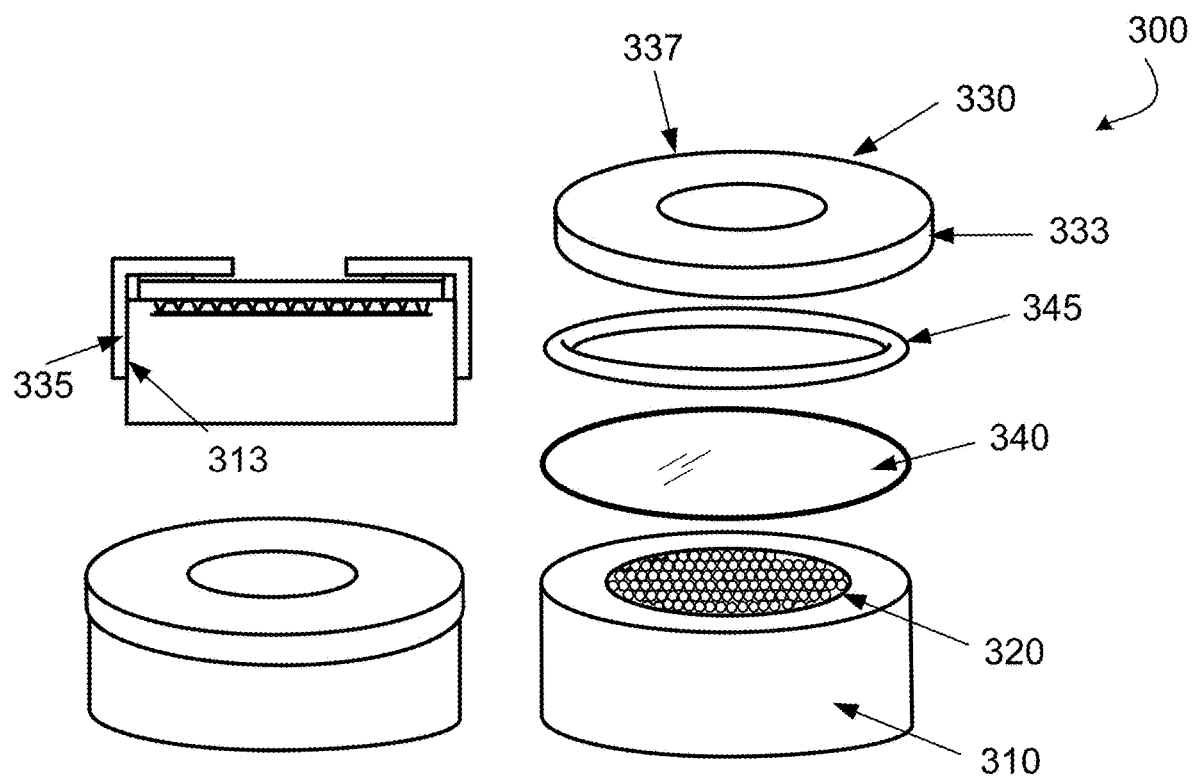
FIGS. 3A and 3B show examples of a textured retro-reflective marker with a liquid seal mechanism and corresponding exploded views.
Figure 3B:
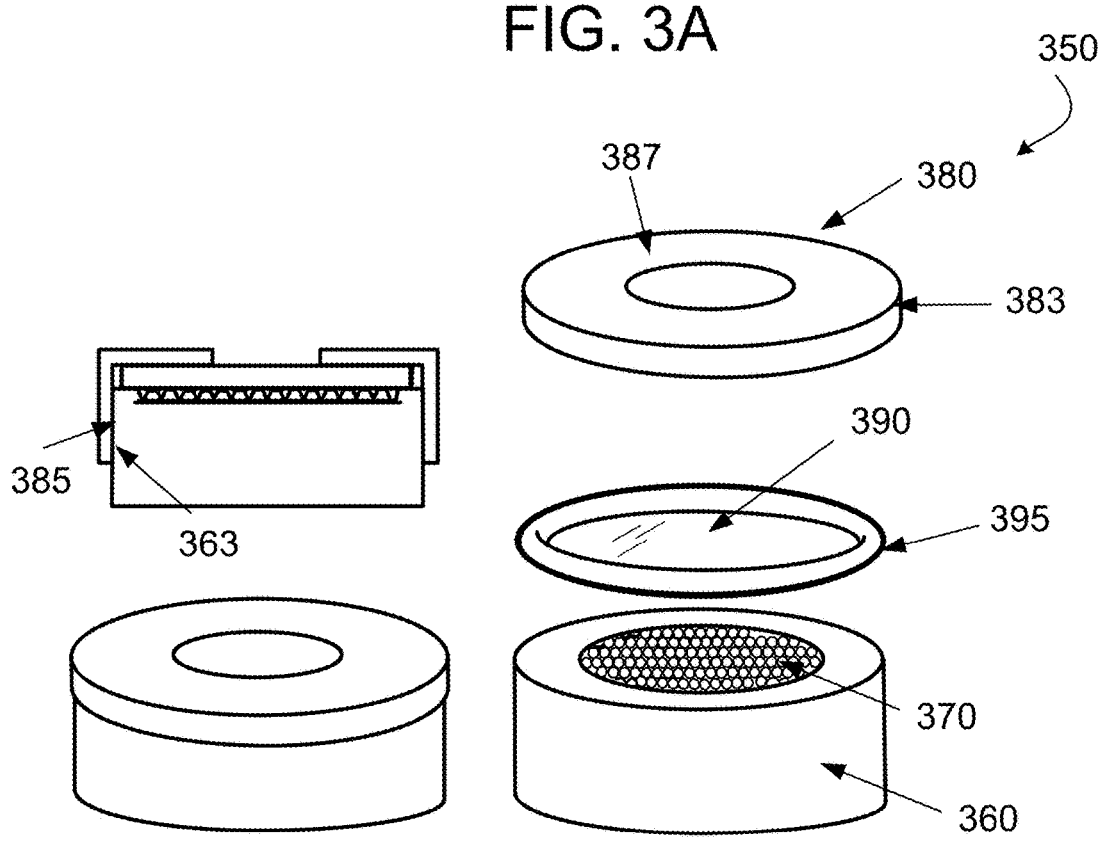

In some implementations, a textured retro-reflective marker (e.g., marker 250 of FIG. 2B) can include one or more liquid seal mechanisms to prevent liquid contamination or residual on the textured retro-reflective layer. The liquid seal mechanism can be implemented through one or more techniques. FIGS. 3A and 3B show examples of a textured retro-reflective marker with a liquid seal mechanism and corresponding exploded views.

As shown in FIG. 3A, a textured retro-reflective marker 300 can include a retro-reflective layer 320 received on a top surface, in an indentation of a base 310, etc. The retro-reflective layer 320 can be equivalent to the retro-reflective layer 220 of FIG. 2A, retro-reflective layer 290 of FIG. 2B, or the retro-reflective layer 150 of FIG. 1B. The textured retro-reflective marker 300 can further include a protective layer 340 positioned over the textured retro-reflective layer 310. The protective layer 340 can be equivalent or similar to the protective layer 280 of FIG. 2B.

The retro-reflective marker 300 can include a border 330 positioned on top of the protective layer 340. Border 330 can be equivalent to border 230 of FIG. 2A, or the border 270 of FIG. 2B. However, border 330 can have different geometry from a flat donut shape. Instead, the border 330 can be formed into a cap having a border base 337 and a cylindrical sidewall 333. The border base 337 can have a flat donut shape and define a central opening, similar to the borders 230 and 270. The border base 337 and the cylindrical sidewall 333 further define a cavity for receiving at least a top portion of the base 310 and components placed between the border 330 and base 310. The inner surface 335 of the sidewall 333 can include a connection mechanism for coupling the border 330 with the base 310. For example, the connection mechanism can include threads, grooves, etc. to engage with corresponding threads, guides, channels, etc. located on the outer surface 313 of the sidewall of the base 310. As another example, the connection mechanism can be provided by snap fit or pressure fit. Yet as another example, the border sidewall inner surface 335 and the base outer surface 313 can be coupled using suitable mechanical bonding or adhesive materials. Once the border 330 and the base 310 are coupled together, fluid can be prevented from accessing the textured retro-reflective layer 320 from the interface between the border 330 and the base.

Referring back to FIGS. 2A and 2B, although borders 230 and 270 are depicted in a flat donut shape for case of illustration, it should be appreciated that borders 230 and 270 can be formed in a cap shape similar to border 330.

To prevent liquid from covering or accessing the textured retro-reflective layer through the opening defined by the border, the textured retro-reflective marker 300 can further include one or more liquid seal mechanisms. For example and as shown in FIG. 3A, the textured retro-reflective marker 300 can include an adhesive tape 345 placed between the top surface of the protective layer 340 and the inner surface of the border base 337. The adhesive tape 345 can seal the interface between the border base 337 and the protective layer 340. In general, the adhesive tape 345 is designed to cover at least a ring-shaped region on the top surface of the protective layer 340. For example, the adhesive tape 345 can have an annular ring shape with an outer diameter substantially similar or the same as the outer diameter of the protective layer 340. The adhesive tape 345 can further have an inner diameter slightly smaller than the outer diameter of the protective layer 340, but greater than or equal to the inner diameter of the opening defined by the border base 337. The adhesive tape 345 can be adhesive on both sides such that the adhesive tape 345 can adhere the inner surface of the border base 337 to the top surface of the protective layer 340. The adhesive tape 345 and the protective layer 340 are aligned at the center when the adhesive tape 345 is adhered to the protective layer 340. Once the protective layer 340 is adhered to the border base 337 by the adhesive tape 345, liquid (e.g., water or other fluid) is obstructed from flowing into the textured retro-reflective layer 320 through the interface between the protective layer 340 and the border base 337. It should be noted that the adhesive tape 345 can have other shapes, geometries, sizes, etc. as long as the liquid seal is provided between the protective layer 340 and the border 330. In some cases, adhesive tape 345 can be a very high bond (VHB) adhesive tape. The shape of the adhesive tape 345 (e.g., an annular ring shape) can be formed by die-cut or laser cut.

Alternatively, an elastic material other than adhesive tape can be used to achieve the liquid seal mechanism. For example and as shown in FIG. 3B, the textured retro-reflective marker 350 can include an elastic band or gasket 395 to provide the liquid seal mechanism. Details of the elastic band or gasket 395 are described below.

Similar to FIG. 3A, the textured retro-reflective marker 350 can include a retro-reflective layer 370 received on a top surface, in an indentation, etc. of a base 360. The retro-reflective layer 370 can be equivalent to the retro-reflective layer 320 of FIG. 3A, the retro-reflective layer 220 of FIG. 2A, retro-reflective layer 290 of FIG. 2B, or the retro-reflective layer 150 of FIG. 1B. The textured retro-reflective marker 350 can include a protective layer 390 positioned over the textured retro-reflective layer 360. The protective layer 390 can be equivalent to the protective layer 280 of FIG. 2B or the protective layer 340 of FIG. 3A.

Similarly, the retro-reflective marker 350 can include a border 380 positioned on top of the protective layer 390. Border 380 can be equivalent to border 330 of FIG. 3A, the border 230 of FIG. 2A, or the border 270 of FIG. 2B. Border 380 can be formed into a cap with a border base 387 and a cylindrical sidewall 383, similar to border 330 of FIG. 3A. In this example, the border base 387 can have a flat donut shape and define a central opening. The border base 387 and the cylindrical sidewall 383 can also define a cavity for receiving at least a top portion of the base 360 and components placed between the border 380 and the base 360.

Similar to FIG. 3A, the inner surface 385 of the sidewall 383 can include a connection mechanism for coupling the base 360 with the base 380. For example, the connection mechanism can include threads, grooves, etc. to engage with corresponding threads, guides, channels, located on the outer surface 363 of the sidewall of the base 360. As another example, the connection mechanism can be provided by snap fit or pressure fit. As another example, the border side wall inner surface 385 and the base outer surface 363 can be coupled using suitable mechanical bonding or adhesive materials.

As described above, the textured retro-reflective marker 380 can include an elastic band or gasket 395 to prevent liquid from covering or accessing the textured retro-reflective layer 370 through the opening defined by border 380. The elastic band or gasket 395 can have a shape similar to the adhesive tape 345 of FIG. 3A, e.g., the elastic band 395 can be a thin film of an annular ring shape with an outer diameter substantially the same as the outer diameter of the protective layer 390, and an inner diameter greater than or equal to the diameter of the opening defined by the border 380. The elastic band 395 can be positioned between the base 380 and the protective layer 390. When the border 380 is coupled with the base 360 through the connection mechanism (e.g., threads, pressure-fit, bonding, adhesive material, or one or more other suitable connections), the elastic band 395 is deformed and held in place, which seals the interface to prevent liquid from getting onto the textured retro-reflective layer. In some cases, the elastic band 395 can adhere to the protective layer 390, the border base 387, or both. The elastic band 395 can include various materials, such as silicone or other suitable materials.

Instead of having an annular ring-shaped band (e.g., having a generally rectangular cross-section), the elastic band or gasket 395 can have an o-ring shape (e.g., having a generally circular cross-section). The o-ring-shaped elastic band 395 can be attached or coupled with the circumference of the protective layer. For example, the o-ring-shaped elastic band 395 can have an inner diameter slightly smaller than the outer diameter of the protective layer 390, so that the o-ring-shaped elastic band 395 can be coupled to the circumference of the protective layer 390 through pressure fit or snap fit. The o-ring-shaped elastic band 395 can further have an outer diameter smaller than the inner diameter defined by the border sidewall 383. When the border 380 is coupled with the base 360, the o-ring-shaped elastic band 395 is deformed and held in place to provide the liquid seal. Accordingly, liquid cannot flow onto and cover the textured retro-reflective layer 370 through the opening defined by border 380. Nor can water leak through the interface between border 380 and the protective layer 390. In addition, the elastic band 395 can, when deformed, seal the interface between the border 380 and the top surface of the base 360. Thus, the elastic band 395 provides a second-level liquid seal for the interface between the border 380 and the base 360. In other words, liquid getting through the interface (e.g., threaded connection) between the border 380 and the base 360, if any, is prevented from covering or accessing the textured retro-reflective layer 370 by the elastic band 395.

Figure 4A:
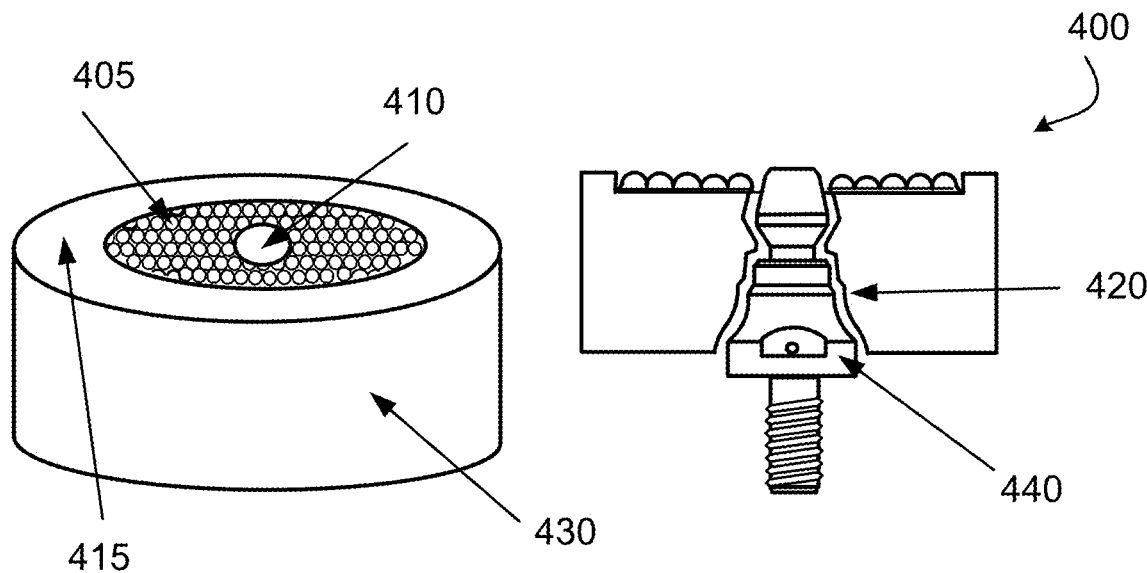
FIGS. 4A and 4B show examples of a retro-reflective assembly assembled by a connector.
Figure 4B:
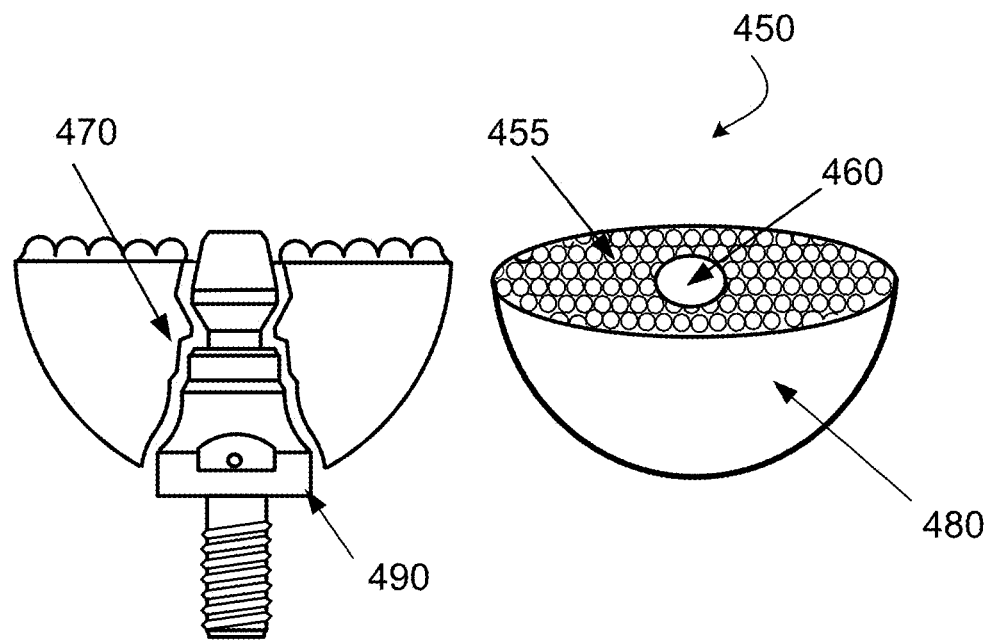

FIGS. 4A and 4B show examples of a retro-reflective assembly that includes a connector. The connector is further configured to couple a base, another portion of the assembly, etc. to a medical device. In general, the assembly can include a base and a textured retro-reflective layer received in the base. Alternatively, the assembly can further include a protective layer, as described in FIG. 2B. In general, one or more textured retro-reflective markers can be coupled to a medical device (e.g., a surgical tool). The medical device with textured markers can be used as a tracking object that is detectable by an optical tracking system. The optical tracking system can locate the positions and the orientations of the medical device by the retro-reflective light provided by the textured retro-reflective markers.

FIG. 4A shows an example of a retro-reflective assembly 400 that mates to a connector 440. FIG. 4B shows another example of a retro-reflective assembly 450 that mates to another connector 490. The respective bases 430 and 480 can be equivalent to the bases 210 and 260 of FIGS. 2A and 2B. The textured retro-reflective layers 405 and 455 can be equivalent to the textured retro-reflective layers 220 and 290 of FIGS. 2A and 2B, respectively, or the textured retro-reflective layer 150 of FIG. 1B.

Although FIGS. 4A and 4B are absent a border in this arrangement (e.g., to assist the reader, for ease of illustration, etc.), a border (similar to border 230 of FIG. 2A, border 270 of FIG. 2B, border 330 of FIG. 3A, or border 380 of FIG. 3B) can be included in the retro-reflective assemblies 400 and 450, respectively. More specifically, a border can be placed on top of the retro-reflective layer 405 in FIG. 4A or the retro-reflective layer 455 in FIG. 4B. Alternatively, at least one function of a border (e.g., providing a lower retro-reflectance capability than the retro-reflectance capability of the retro-reflective layer) can still be achieved or provided without the border. For example and as shown in FIG. 4A, the portion of the top surface 415 of the base 430 not covered by the textured retro-reflective layer 405 can provide a level of retro-reflectance lower than the textured retro-reflective layer 405 (e.g., less than 20% of the retro-reflectance of the retro-reflective layer 405, or at least 20% lower than that of the retro-reflective layer 405). In FIG. 4B, the retro-reflective area can have substantially the same size as the top surface of the base 480. The lower level retro-reflectance (e.g., less than 20% of the retro-reflectance of the retro-reflective layer 455 or at least 20% lower than that of the retro-reflective layer 455) can be provided by the substance surrounding the retro-reflective layer 455, e.g., the air.

As shown in FIG. 4A, the assembly 400 includes a base 430, a textured retro-reflective layer 405 received by the base 430, and a connector 440 for connecting the base 430 and the textured retro-reflective layer 405. In some implementations, the connector 440 can also be configured to couple the base with a device or tool for optical tracking. The base 430 can have, e.g., one or more geometries (e.g., a cylindrical shape). The retro-reflective layer 405 can be received on the top surface or in the indented region (e.g., the indented region 215 of FIG. 2A) of the base 430, as described above.

To receive the connector 440, the base 430 defines a first central opening 420 with varying inner diameters along the longitudinal axis of the central opening 420. The textured retro-reflective layer 405 can further define a second central opening 410 to match the first central opening 420 when the connector 440 is received in the first central opening 420. When the base 430 and the textured retro-reflective layer 405 are assembled by the connector 440, the first central opening 420 and the second central opening 410 are aligned at the center, as shown in FIG. 4A.

The first central opening 420 has varying widths or inner diameters along the longitudinal axis of the first central opening 420. The connector 440, on the other hand, has varying outer diameters that generally match the varying inner diameters of the first central opening 420. This way, the connector 440 can be coupled to the base 430 through the first central opening 420. In some implementations, the connector 440 can further assemble the base 430 and the retro-reflective layer 405 through the first central opening 420 and the second central opening 410.

In general, the varying inner diameters are designed to form a particular connection between the connector 440 and the base, e.g., a snap-fit or pressure fit. For example and as shown in FIG. 4A, the first central opening 420 defines a neck region somewhere along the longitudinal axis of the first central opening 420. The corresponding connector 440 defines a similar neck portion that substantially matches the neck region defined by the first central opening 420. To assemble the connector 440 with the base 430, the top portion of the connector 440 deforms the neck region of the first central opening 420 to pass through the neck region. After the top portion of the connector 440 passes through the neck region, the neck region gradually relaxes to an un-deformed state. When the neck region is in an un-deformed state, the connector 440 is refrained from being detached from the base 430. The top portion of the connector 440 has a bigger outer diameter than the inner diameter of the neck region of the first central opening 420. Accordingly, the neck region needs to be deformed again before the top portion of the connector 440 can pass through it. To deform the neck region, an external force above a particular threshold value is normally required. Thus, the assembly of the base 430 and the connector 440 (and optionally the textured retro-reflective marker) can be maintained over external forces below the threshold value.

In contrast to a snap-fit or pressure fit, the connector 440 and the base 430 can be configured to couple with each other through a threaded connection. In addition, in some implementations, the assembly 400 can further include a protective layer (similar to the protective layer 280 of FIG. 2B), and, optionally, a retaining ring to affix to the textured retro-reflective layer 405 to the base 430.

To attach the assembly 400 to a medical device, the connector 440 can have a threaded bottom portion that, as shown in FIG. 4A, matches with a corresponding portion in the medical device to form a threaded connection. For example, the connector 440 can have extruding threads on the bottom portion, and the medical device can have a corresponding opening with grooves matching the bottom portion and the threads of the connector 440. The medical device can be used as a target or object that is trackable by an optical tracking system. For example, the medical device can include one or more surgical tools. Alternatively, the medical device can further include an end effector of a surgical robot, a hand-held powered tool, a digitizing probe, a patient reference tool (e.g., a locator), or other suitable devices.

In some implementations, the assembly 400 is attached to a device that is used for other applications and industries such as industrial metrology or navigation. For example the device can include a digitizing probe for, e.g., full-field and/or tactile measurement, an optically-trackable scanner, a scale bar for photogrammetry and laser trackers applications, or other suitable devices. In addition, the assembly 400 can be attached to a device used in other industries that also utilize medical devices and other devices. In some implementations, the assembly 400 can be attached to one or more medical devices or other types of devices in concert.

Similarly, FIG. 4B shows an assembly 450 that includes a base 480, a textured retro-reflective layer 455 received in the base 480, and a connector 490 for assembling the base 480 (and optionally the retro-reflective layer 455) and a corresponding medical device. Similar to the configurations depicted in FIG. 4A, the base 480 defines a first central opening 470 with varying inner diameters along the longitudinal axis of the central opening 470. The first central opening 470 defines a neck region that matches a neck portion of the connector 490. The textured retro-reflective layer 455 can further define a second central opening 460. The connector 490 and the textured retro-reflective layer 455 can be equivalent to the connector 440 and the textured layer 405 of FIG. 4A, respectively. However, in contrast to FIG. 4A, the base 480 has a different shape from base 430. More specifically, the base 480 can be a substantially half sphere than a cylinder, although the bases 430 and 480 in FIGS. 4A and 4B include a cylindrical shape and half-spherical shape, respectively, these shapes are just examples, and the base of a textured retro-reflective marker can have other suitable shapes.

Figure 5A:
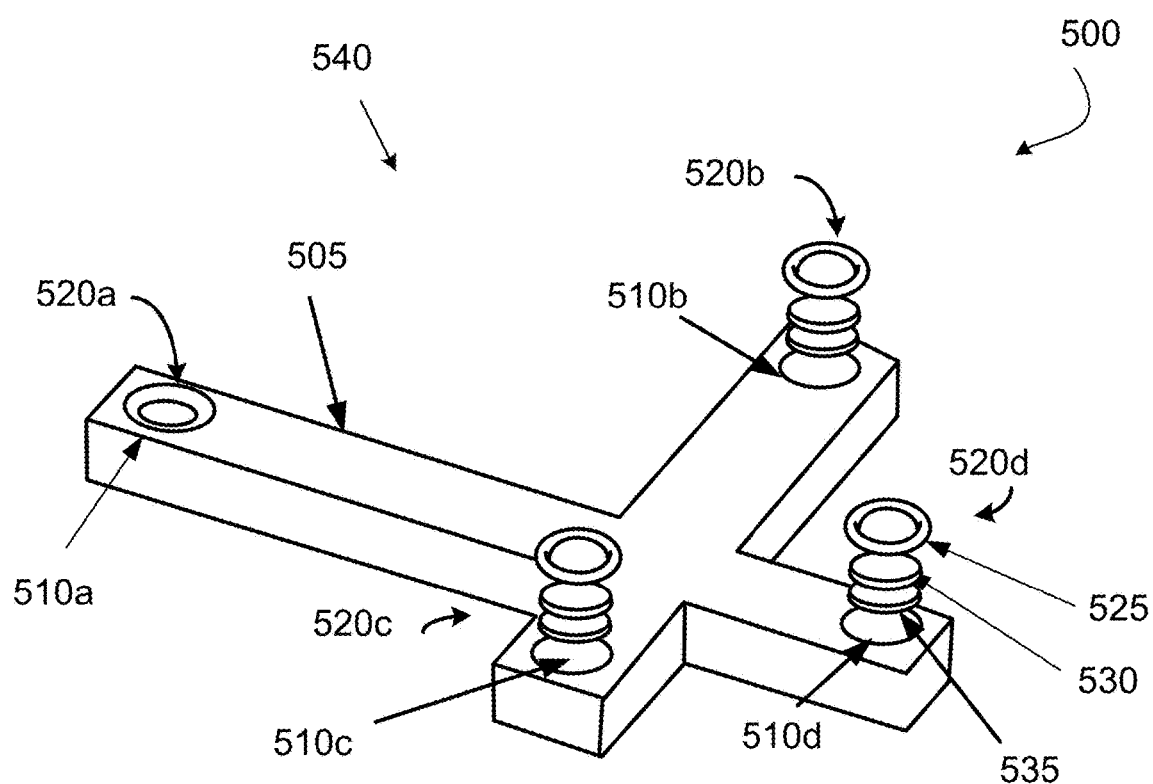
FIG. 5A illustrates an exploded view of multiple retro-reflective markers mounted on a device for optical tracking.
Figure 5B:
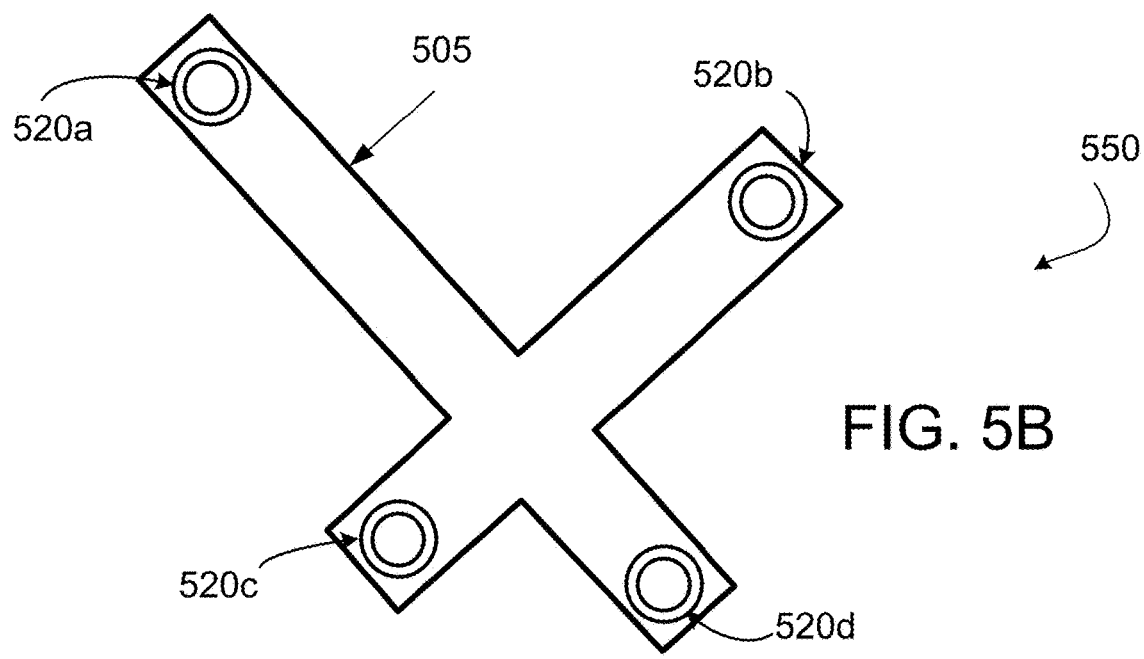
FIG. 5B illustrates a top view of the example illustrated in FIG. 5A.

FIG. 5A illustrates an exploded view 500 of multiple retro-reflective markers mounted on a device 540 for optical tracking, and the top view 550 of this example device 540 is illustrated in FIG. 5B.

More specifically, FIG. 5A illustrates four retro-reflective markers 520a, 520b, 520c, and 520d, respectively. Note that retro-reflective markers 520a, 520b, 520c, and 520d are similar to retro-reflective marker 200 of FIG. 2A, retro-reflective marker 250 of FIG. 2B, retro-reflective marker 300 of FIG. 3A, and retro-reflective marker 350 of FIG. 3B. As shown in FIG. 5A, retro-reflective markers 520a, 520b, 520c, and 520d do not include a base. Instead, retro-reflective markers 520a, 520b, 520c, and 520d can be accommodated by a respective socket or indent located on the top surface of device 505.

In some implementations, one or more of the retro-reflective markers 520a, 520b, 520c, and 520d can include a base (not shown) coupled to the corresponding retro-reflective layer (e.g., 535) of a retro-reflective marker, as described above. The bases are configured to be releasably received by the respective socket or indent (510a, 510b, 510c, or 510d) located on the top surface of device 505. For example, the bases can be coupled with the sockets using different mechanisms, e.g., adhesive materials, pressure/snap fit, threaded coupling, twist coupling, or other suitable couplings.

In general, the device 505, as described above, can include a device used for optical tracking purposes. For example, the device can be a medical tool used in surgical operations. As another example, the device can be an industrial tool used for locating or tracking an industrial object.

As shown in FIG. 5A, device 505 can have a cross-bar shape. The cross-bar shape includes two arms intersecting each other. However, note that device 505 shown in FIG. 5A is illustrated for ease of description, and one should appreciate that device 505 can have a different shape as long as it has a substantive toughness to resist elastic or plastic deformation. For example, device 505 can have a cylindrical shape, a rod shape, a conical shape, or other suitable shapes. In addition, device 505 can have a different angle between two arms, and the size and length of each of the two bars can vary according to different requirements for optical tracking. Furthermore, top views of device 505 can also form a Y-shape, a square shape, a polygon shape, a circular shape, or other suitable shapes. Moreover, the cross-sections of either of the two arms of device 505 can be a square, rectangle, polygon, circle, or other suitable cross-sections.

The top surface of each far end of the cross-bar shape device 505 defines a respective socket or indentation 510a, 510b, 510c, and 510d, sized and shaped for accommodating a retro-reflective marker. More specifically, each of the respective sockets or indentations has a depth substantially similar to the height of a corresponding retro-reflective marker (e.g., 520a, 520b, 520c, and 520d). In some cases, when the corresponding retro-reflective marker is positioned in the socket, the top surface of the corresponding retro-reflective marker and the top surface of the device 505 substantially align in the same plane. That said, the top surface of the corresponding retro-reflective marker can be slightly above or below the top surface of device 505 according to different retro-reflecting requirements. In addition, each of the respective sockets and indentation can be sized properly so that the corresponding retro-reflective marker is assembled into the socket through snap fit or pressure fit. For example, the inner diameter of the sockets can be slightly smaller than the outer diameter of the corresponding retro-reflective marker. In some cases, retro-reflective markers 520a, 520b, 520c, and 520d can be assembled into respective sockets using adhesive material, such as epoxy resin or other suitable adhesive materials.

The retro-reflective markers 520a, 520b, 520c, and 520d can include a ring-shape (or donut-shape) border 525, a protective layer 530, and a retro-reflective layer 535. The retro-reflective layer 535 is similar to those retro-reflective layers described above, e.g., retro-reflective layer 150 of FIG. 1B, retro-reflective layer 220 of FIG. 2A, retro-reflective layer 290 of FIG. 2B, retro-reflective layer 320 of FIG. 3A, retro-reflective layer 370 of FIG. 3B.

The ring-shape border 525 is similar to border 230 of FIG. 2A and border 270 of FIG. 2B. In some cases, the ring-shape border 525 can be similar to border 330 of FIG. 3A and border 380 of FIG. 3B, which is formed into a cap shape having a border base and a cylindrical sidewall. The cylindrical sidewall can be configured to protect the retro-reflective layer from external contamination, as described above.

The protective layer 530 can have an NIR anti-reflective coating and can be an NIR filter, as described above. In addition, the protective layer 530 is positioned on top of the textured retro-reflective layer 535 to reduce the sensitivity of contamination. For example, liquids and dirt can be blocked away from the textured retro-reflective layer 535 by the protective layer 530. Moreover, as described above, the protective layer 530 can be flat and transmissive in the NIR spectrum of 750 nm to 2500 nm. In some cases, the protective layer 530 can be transmissive in the visible spectrum of 380 nm to 750 nm, as described above.

Note that the retro-reflective markers 520a, 520b, 520c, and 520d are illustrated in FIGS. 5A and 5B for case of illustration. Thus, it should be appreciated that retro-reflective markers 520a, 520b, 520c, and 520d can include additional components that are not explicitly illustrated in FIG. 5A. For example, retro-reflective markers 520a, 520b, 520c, and 520d each can include an adhesive tape (similar to the adhesive tape 345 of FIG. 3A) placed between the top surface of the protective layer 530 and the inner surface of the border base 525. The adhesive tape can seal the interface between the border base 525 and the protective layer 530. Additionally or alternatively, retro-reflective markers 520a, 520b, 520c, and 520d each can include an elastic band or gasket (similar to gasket 395 of FIG. 3B) to prevent liquid from covering or accessing the textured retro-reflective layer 535 through the opening defined by border 525.

Figure 6:
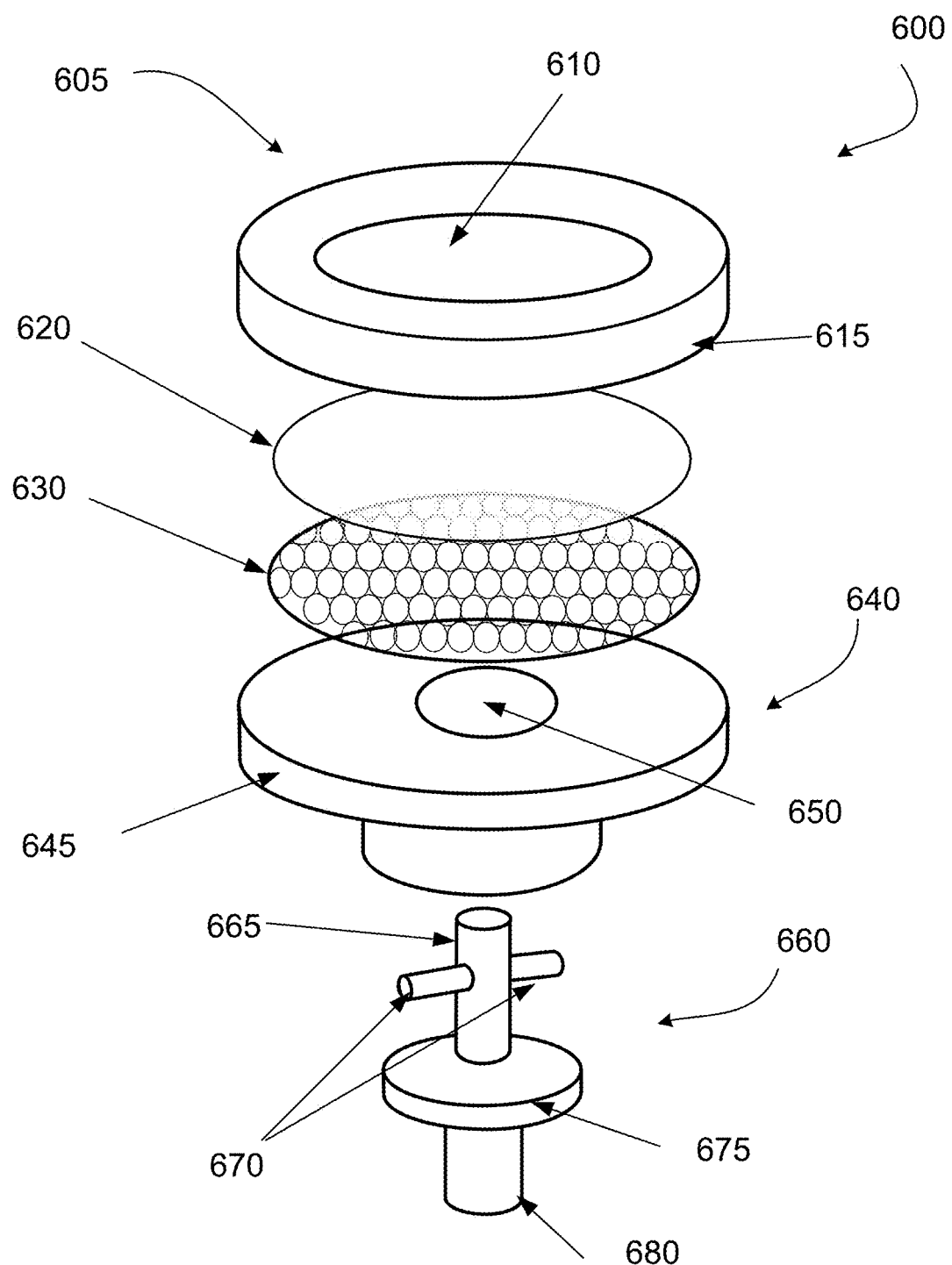
FIG. 6 illustrates an exploded view of another example retro-reflective marker.

FIG. 6 illustrates an exploded view of another example retro-reflective marker 600. Here, the retro-reflective marker 600 is similar to the retro-reflective marker 200 of FIG. 2A, retro-reflective marker 250 of FIG. 2B, retro-reflective marker 300 of FIG. 3A, retro-reflective marker 350 of FIG. 3B, retro-reflective marker 400 of FIG. 4A, and retro-reflective marker 450 of FIG. 4B.

As shown in FIG. 6, retro-reflective marker 600 includes a border 605. Border 605 can be equivalent to border 230 of FIG. 2A, the border 270 of FIG. 2B, the border 330 of FIG. 3A, and the border 380 of FIG. 3B. Here, border 605 is generally in a cap form, which defines an opening 610 on the cap base surface and includes one or more side structures 615 extending from the cap base surface. The opening 610 defines a retro-reflective area on the retro-reflective layer 630, as described above.

In some implementations, the side structures 615 can form a side wall so that border 605 as a whole defines a cavity for receiving at least a top portion of the base 640 and components placed between border 605 and base 640. In some implementations, one or more side structures 615 can be separate from each other, and each can be configured to couple with a corresponding portion of the base 640. More specifically, one or more side structures 615 can include a connection mechanism configured to releasably attach the border 605 to base 640 to form an assembled retro-reflective marker 600. For example, the connection mechanism can include threads, grooves, etc., to engage with corresponding threads, guides, channels, etc., located on the outer surface 645 of base 640. As another example, the connection mechanism can be provided by snap fit or pressure fit. Yet as another example, the border 605 and the base 640 can be coupled using suitable mechanical bonding or adhesive materials.

The retro-reflective marker 600 further includes a base 640. The base 640 includes one or more side structures 645 configured to interact with the one or more side structures 615 of the border 605. As shown in FIG. 6, one or more side structures 645 can include a side wall configured to couple with the side structures 615 of the border 605. Border 605 can be coupled to base 640 by rotating border 605 clockwise or counterclockwise by a particular degree so that one or more side structures 615 of border 605 are coupled with one or more side structures 645 of base 640. As described above, the base 640 can be coupled with the border 605 using different mechanisms, e.g., by adhesive material, snap fit, twisting connection, threaded connection, or other suitable connecting mechanisms.

The retro-reflective marker 600 includes a retro-reflective layer 630 positioned beneath the protective layer 620. The retro-reflective layer 630 is similar to the retro-reflective layer 150 of FIG. 1B, retro-reflective layer 220 of FIG. 2A, retro-reflective layer 290 of FIG. 2B, retro-reflective layer 320 of FIG. 3A, retro-reflective layer 370 of FIG. 3B, and retro-reflective layer 535 of FIG. 5A. Similar to those described above, retro-reflective layer 630 can include a periodic pattern, e.g., a sinusoidal shape with a specific wavelength and amplitude. For example, the wavelength can range from 1% to 50% of the characteristic size of the textured surface of the retro-reflective layer 630. The amplitude can range from 0.5% to 25% of the characteristic size of the textured surface of the retro-reflective layer 630. The characteristic size for the textured surface of the retro-reflective layer 630 can include a diameter, an edge length, a diagonal length, or other suitable sizes of the textured surface of the retro-reflective layer 630. In some cases, the textured surface of the retro-reflective layer 630 can have one or more portions with a repeating wavy pattern. For example, the wavy patterns can have one or more periods. In some cases, the textured surface of the retro-reflective layer 630 can have more than one repeated wavelength and amplitude. Alternatively, the textured surface of the retro-reflective layer 630 might not have any repeated patterns.

The border 605 can cover a protective layer 620. The protective layer 620 is similar to the protective layer 280 of FIG. 2B, the protective layer 340 of FIG. 3A, the protective layer 390 of FIG. 3B, and the protective layer 530 of FIG. 5A. The protective layer 620 can be used to block liquids and dirt from contaminating the retro-reflective layer 630. The protective layer 620 can be flat and transmissive in the NIR spectrum of 750 nm to 2500 nm, as described above. In some cases, the protective layer 620 can be transmissive in the visible spectrum of 380 nm to 750 nm.

It should be noted that the surface topology of the textured surface of the retro-reflective layer 630 can include other suitable geometries and patterns. For example, the retro-reflective layer 630 can include a central region that is not retro-reflective and does not include any above-described patterns. Alternatively, the retro-reflective layer 630 can define a central opening, similar to the retro-reflective layer 405 of FIG. 4A and the retro-reflective layer 455 of FIG. 4B.

The base 640 can define a central opening 650. The central opening can be a through-hole that extends from the top surface to the bottom surface of the base 640. The through-hole can be configured to couple with a device for optical tracking or a connector configured to couple base 640 with an optical tracking device.

In some implementations, the central opening 650 can be a non-through hole (or an indentation or socket) from the top surface of the base 640 into the base 640. The retro-reflective layer 630 (and other components positioned above the retro-reflective layer 630) can be accommodated inside the non-through hole, similar to the coupling described in FIG. 5A. In these cases, the bottom surface of the base 640 can be coupled to the top surface of a device (or a connector) using one or more adhesive materials.

The center of the central opening 650 (or the center of the base 640) generally aligns with the center of the retro-reflective area in the retro-reflective layer 630 when the retro-reflective marker 600 is assembled. As described above, the retro-reflective area is defined by border 605, as described above. Border 605 includes a locating mechanism to ensure the center of the retro-reflective area aligns with the center of the central opening 650. Alternatively or in addition, the base 640 can include the locating mechanism. The locating mechanism can include a ridge surrounding the outer diameter of the base 640. The ridge can be sized and shaped to guide the retro-reflective layer 630 to the position that aligns the center of the retro-reflective layer 630 with the center of the base 640 (or the center of the central opening 650).

The central opening 650 includes a connecting mechanism configured to be releasably coupled to a connecter 660. The connecting mechanism can include a snap-fit or pressure fit. For example, the connecting mechanism of the central opening 650 can have a smaller inner diameter than the outer diameter of the connector 660 for a snap fit or pressure fit. In some implementations, the connecting mechanism can include threads or grooves for coupling with corresponding threads or grooves of the connector 660, as described above.

Referring to the retro-reflective marker 600 shown in FIG. 6, the connector 660 can be releasably coupled to the base 640 by a twist or rotation coupling. More specifically, the connector 660 includes a body 675 defining a top surface and a bottom surface. A conical or cylindrical structure 665 extends from the top surface upward, and the conical structure 665 includes two side projects 670, which extend radially outward from the outer surface of the conical structure 665. The two side projects 670 and the conical structure 665 are configured to be accommodated by two grooves in the central opening 650 (not shown) so that the connector 660 can be freely inserted into the central opening 650.

Note that the shape, size, and number of side projects 670 shown in FIG. 6 are only for ease of illustration, one should appreciate that connector 660 can include a different number of side projects. For example, connector 660 can include one, three, four, five, or other numbers of side projects 670 according to different connecting requirements. In addition, the shape of the side project 670 can include other suitable cross-sections, such as square, rectangular, round, and oval, or other suitable cross-sections.

To lock the connector 660, the central opening 650 further defines a pic-shape or donut shape cavity (not shown) at a position corresponding to the position of the two side projects 670. After the connector 660 has been inserted into the central opening 650 of the base 640, a user can rotate the base 640 or the connector 660 by a particular angle, either clockwise or counterclockwise, so that the two side projects 670 are rotated into the pie-shape cavity from the two grooves. The particular angle can range from 40 degrees to 170 degrees depending on the number of side projects 670.

The system can further include a "détente" structure for a controlled release or decoupling between the connector 660 and the base 640 when the connector 660 is twisted into the pie-shape cavity. For example, the "détente" feature can be located at a particular position in the pie-shape or donut shape cavity so that when the two projects 670 are moved to the particular position, a user needs to apply a force above a threshold friction to move those two projects 670 out of the particular position. Additionally or alternatively, the pie-shape or donut shape cavity defined by the central opening can include a clutch configured to lock the two projects 670 in position when the two projects 670 are moved into the pie-shape or donut shape cavity. The user needs to apply a force above a threshold force to move the two projects 670 out of the clutch.

To unlock or release the connector 660 from the base 640, the user can apply a force above the threshold force to rotate the base 640 or the connector 660 by another particular angle to move the two projects 670 back into the two grooves and then remove connector 660 out of the central opening 650.

The connector 660 can further include a protrusion 680 extending from the bottom surface downward. The protrusion 680 can include a thread or groove configured to releasably couple with a corresponding thread or groove on a device for optical tracking. Alternatively or additionally, the protrusion 680 can be configured to couple with a device through pressure fit, using adhesive materials, welding, etc. In some implementations, the device for optical tracking can include devices for industrial metrology or navigation. As described above, the device can include a digitizing probe for, e.g., full-field and/or tactile measurement, an optically trackable scanner, a scale bar for photogrammetry and laser tracker applications, or other suitable devices. In some implementations, the device can include one or more medical devices or other types of devices used in concert.

Note that the connector 660 shown in FIG. 6 is illustrated for case of explanation, and one should appreciate that the connector 660 can include similar structures or other types or shapes of the structure according to different requirements for coupling the connector 660 to the base 640 or to a device for optical tracking.

Figure 7:
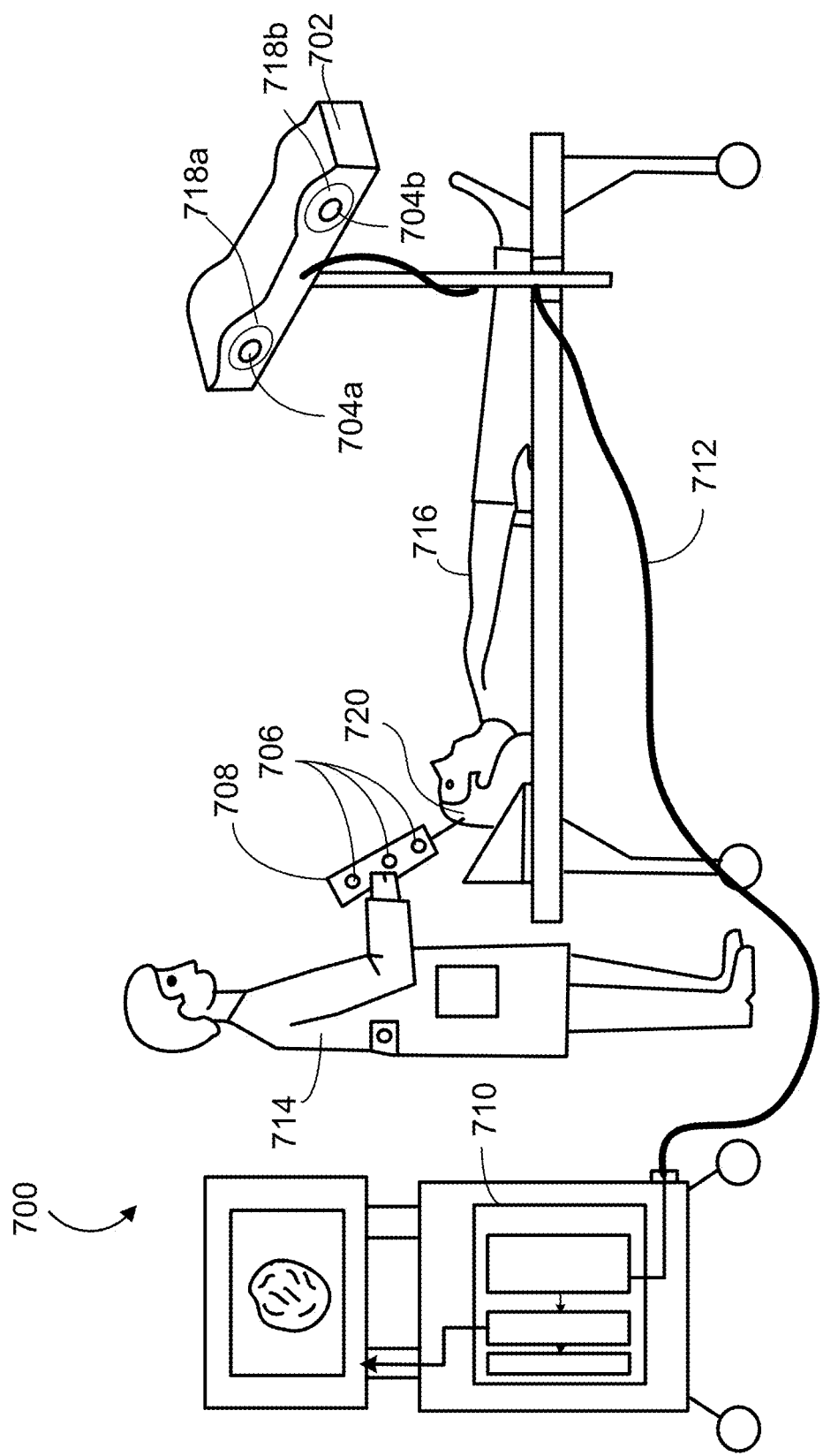
FIG. 7 shows an example tracking system that includes a textured retro-reflective marker, for example, a textured retro-reflective marker of FIGS. 2A, 2B, 3A, 3B, 4A, 4B, 5A, 5B, and/or 6.

FIG. 7 shows an example of a tracking system 700 (e.g., an optical tracking system) that includes multiple targets or objects (e.g., the textured retro-reflective layer 150 of FIG. 1B, the retro-reflective marker 200 of FIG. 2A, the retro-reflective marker 250 of FIG. 2B, the retro-reflective marker 300 of FIG. 3A, the retro-reflective marker 350 of FIG. 3B, the retro-reflective markers 520a, 520b, 520c, and 520d of FIG. 5A, and retro-reflective marker 600 of FIG. 6). The tracking system 700 includes an illumination/image capture unit 702 in which a marker sensing device (e.g., a camera, an array of cameras 704a-b, etc.) and marker illuminating device(s) 718a-b (e.g., electromagnetic waves source) that are rigidly mounted. In this example, the illuminating devices 718a-b emit electromagnetic waves, such as visible light, infrared light, etc. The electromagnetic waves are directed at a region that includes the one or more textured retro-reflective markers (e.g., markers 200 of FIG. 2A, or markers 250 of FIG. 2B) that are affixed to a medical device (or an object). In the context shown in FIG. 1, the medical device (or an object) can be a tool 708 (e.g., a surgical tool, medical device for treating a patient, etc.). The object is sometimes referred to as a tracked object. The textured retro-reflective markers are configured to have retro-reflectivity to reflect incoming electromagnetic waves in a parallel and opposite direction from the incoming direction. The cameras 704a-b capture one or more images of the illuminated retro-reflective markers. Due to the highly retro-reflective nature of the textured retro-reflective markers, each marker appears as a relatively bright spot in the captured images, and the system can determine the spatial coordinates (e.g., Cartesian, spherical, cylindrical, etc.) and an intensity value that represents, for example, the brightness of each corresponding spot. Due to the greater range for incident angles provided by the textured retro-reflective markers, the marker can remain visible at different poses or positions relative to the light sources. This data is provided to a computing device (e.g., a processor) of a computing system 710. The computing device is configured to determine where in the region or environment the textured retro-reflective markers (and corresponding objects they are attached to) are located with respect to the cameras 704a-b.

Generally, the computing device is part of the computer system 710 that is connected to the array of cameras 704a-b via communication links 712 (e.g., wired communication links or wireless communication links). In some examples, the computing device is located within the camera mounting unit 702. The computing system 710 may include one or more of various forms of digital computers, including, e.g., laptops, desktops, workstations, personal digital assistants, servers, blade servers, mainframes, and other appropriate computers. The computing system 710 may include one or more of various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed herein.

Given the known locations of the cameras 704a-b included in the array and the locations of the textured retro-reflective markers (e.g., textured marker 200 of FIG. 2A or textured marker 250 of FIG. 2B), the computing device can calculate a position and/or orientation of the object 708. Further, on the basis of the known relationship between the location of each of the textured retro-reflective markers and the location of a tip 720 of the object 708 in the working volume (e.g., a tool coordinate system), the computing device can calculate the coordinates of the tool tip 720 in space. In those instances in which the tool 708 is handled by a user (e.g., a surgeon 714) and the tooltip 720 is pressed against or is otherwise in contact with a surface (e.g., a body 716 of a patient), the coordinates of the tool tip 720 correspond to the coordinates of the point at which the tool tip 720 contacts the surface.

A number of implementations of the subject matter have been described. Nevertheless, it will be understood that various modifications may be made without departing from the spirit and scope of the subject matter disclosed herein. For example, the position of textured retro-reflective markers and tracked objects can change with time. The computing device may be configured to automatically detect which bright spots in an image are identified as retro-reflections provided by the textured retro-reflective markers at a first time and at first positions, and which bright spots in the image are identified as retro-reflections provided by the textured retro-reflective markers at a second time and at second positions. Accordingly, other implementations are within the scope of the following claims.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, tracking system 700 and the computing system 710 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. For example, a computing system (such as computing system 710) can be used in the tracking system to control operation of the emitter and to process the images captured by the image sensor. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, computing system 710 includes a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
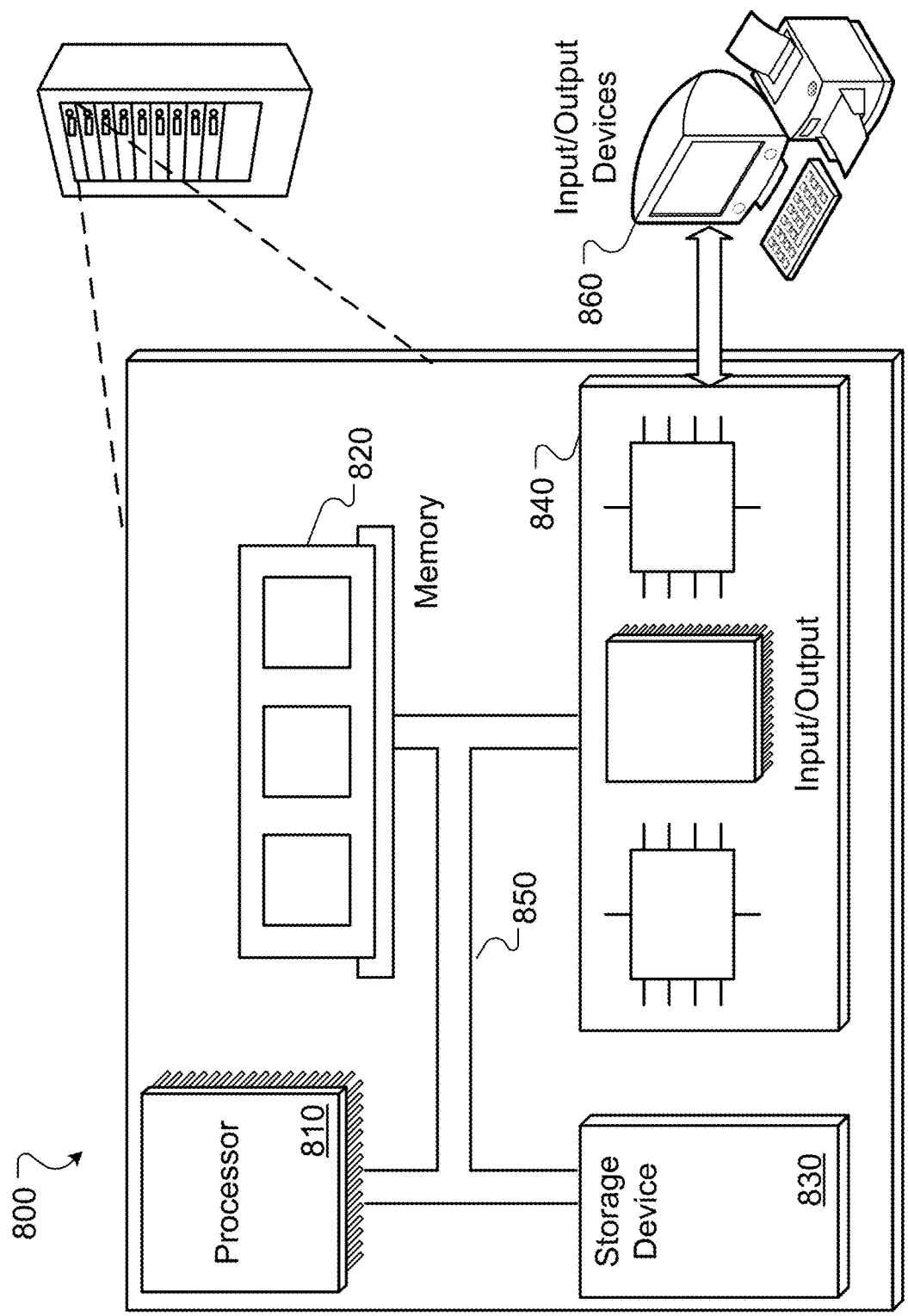
FIG. 8 shows a diagram of an example computing system.

FIG. 8 shows an example computer system 800 (e.g., similar to or including computing system 710 of FIG. 7) that includes a processor 810, a memory 820, a storage device 830 and an input/output device 840. Each of the components 810, 820, 830 and 840 can be interconnected, for example, by a system bus 850. The processor 810 is capable of processing instructions for execution within the system 800. In some implementations, the processor 810 is a single-threaded processor, a multi-threaded processor, or another type of processor. The processor 810 is capable of processing instructions stored in the memory 820 or on the storage device 830. The memory 820 and the storage device 830 can store information within the system 800.

The input/output device 840 provides input/output operations for the system 800. In some implementations, the input/output device 840 can include one or more of a network interface device, e.g., an Ethernet card, a serial communication device, e.g., an RS-232 port, and/or a wireless interface device, e.g., an 802.11 card, a 3G wireless modem, a 4G wireless modem, an 8G wireless modem, etc. In some implementations, the input/output device can include driver devices configured to receive input data and send output data to other input/output devices, e.g., keyboard, printer and display devices 860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Thus, specific embodiments of the optical tracking system and retro-reflective markers and methods for using the optical tracking system to track retro-reflective markers have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Where a range of values is provided, it is understood that each intervening value, to the tenth of the unit of the lower limit unless the context clearly dictates otherwise, between the upper and lower limit of that range and any other stated or intervening value in that stated range is encompassed within the subject matter disclosed herein. The upper and lower limits of these smaller ranges may independently be included in the smaller ranges is also encompassed within the subject matter disclosed herein, subject to any specifically excluded limit in the stated range. Where the stated range includes one or both of the limits, ranges excluding either or both of those included limits are also included in the subject matter disclosed herein.

Unless defined otherwise, all technical and scientific terms used herein have the same meaning as commonly understood by one of ordinary skills in the art to which this subject matter belongs. Although any methods and materials similar or equivalent to those described herein can also be used in the practice or testing of the present subject matter, a limited number of the exemplary methods and materials are described herein.

What is claimed is:

1. An apparatus comprising:
a retro-reflective marker, comprising:
a retro-reflective layer having a first retro-reflectance capability, the retro-reflective layer comprising:
a textured surface, a portion of the textured surface having a surface topology such that surface normal vectors of the portion of the textured surface extend from the portion of the textured surface in different directions, and
a plurality of retro-reflective micro elements distributed across the textured surface; and
a border defining a retro-reflective area of the retro-reflective layer, wherein a portion of the border provides a second retro-reflectance capability lower than the first retro-reflectance capability; and
a base comprising at least one feature configured to guide the retro-reflective layer when the retro-reflective layer is placed on a top surface of the base such that the retro-reflective area aligns with a pre-determined location of the base.

2. The apparatus of claim 1, wherein the base is part of a device for optical tracking, and wherein the at least one feature includes a socket configured to receive the retro-reflective marker.

3. The apparatus of claim 1, wherein each of the plurality of retro-reflective micro elements has a retro-reflective axis aligned with a corresponding surface normal vector at a corresponding location that the retro-reflective micro element is adhered.

4. The apparatus of claim 1, wherein the retro-reflective marker is visible for light incident relative to a surface normal vector of the textured surface at an angle above 55 degrees.

5. The apparatus of claim 1, wherein the second retro-reflectance capability is lower than the first retro-reflectance capability by at least 20%.

6. The apparatus of claim 1, wherein the portion of the border includes a ring-shape geometry with a width of at least 1 millimeter.

7. The apparatus of claim 1, wherein the surface topology is periodic, wherein the surface topology includes a sinusoidal geometry that includes one or more waves, and a wavelength of the one or more waves of the surface topology ranges between 1% and 50% of a size of the retro-reflective area.

8. The apparatus of claim 1, wherein the surface topology is periodic, wherein the surface topology includes a sinusoidal geometry that includes one or more waves, and an amplitude of the one or more waves of the surface topology ranges between 0.5% and 25% of a size of the retro-reflective area.

9. The apparatus of claim 1, further comprising: a protective layer positioned over the retro-reflective layer.

10. The apparatus of claim 9, wherein the protective layer comprises an anti-reflective coating applied to a top surface or a bottom surface of the protective layer.

11. The apparatus of claim 10, wherein the anti-reflective coating comprises a near-infrared (NIR) wavelength-specific anti-reflective coating.

12. The apparatus of claim 9, wherein the protective layer covers the retro-reflective layer, and the border partially covers the protective layer.

13. The apparatus of claim 1, wherein the retro-reflective layer has a circular shape.

14. A marker comprising:
a retro-reflective layer having a first retro-reflectance capability, the retro-reflective layer comprising:
a textured surface, a portion of the textured surface having a surface topology such that surface normal vectors of the portion of the textured surface extend from the portion of the textured surface in different directions, and
a plurality of retro-reflective micro elements distributed across the textured surface; and
a base comprising a top surface where the retro-reflective layer is placed, the top surface providing a second retro-reflectance capability lower than the first retro-reflectance capability, wherein the base comprises a locating feature configured to guide the retro-reflective layer when the retro-reflective layer is placed on the top surface of the base such that a retro-reflective area of the retro-reflective layer aligns with a pre-determined location of the base.

15. The marker of claim 14, wherein when the retro-reflective layer is placed on the top surface of the base, the center of the retro-reflective area aligns with a center of the base.

16. The marker of claim 14, wherein the base comprises a central opening configured to releasably attach to a connector.

17. The marker of claim 16, wherein the connector comprises:
a body having a top surface and a bottom surface,
a conical structure extending from the top surface, and
two projects extending from an outer surface of the conical structure, wherein the central opening is configured to receive the conical structure and the two projects.

18. The marker of claim 17, wherein the central opening is configured to releasably couple with the connector by inserting and twisting the connector by a particular angle.

19. The marker of claim 18, wherein the central opening further comprises a cavity at a position corresponding to the two projects so that when the two projects are twisted into the cavity, the connector is releasably coupled to the base.

20. The marker of claim 16, wherein the connector is configured to releasably couple to the base by a snap-fit connection or threaded connection.

* * * * *